US012521631B2

(12) United States Patent
Yamamoto et al.

(10) Patent No.: US 12,521,631 B2
(45) Date of Patent: Jan. 13, 2026

(54) NON-TRANSITORY COMPUTER-READABLE STORAGE MEDIUM FOR BUILDING MODE WITH CORRESPONDING SYSTEM, APPARATUS, AND METHOD

(71) Applicant: NINTENDO CO., LTD., Kyoto (JP)

(72) Inventors: Naoya Yamamoto, Kyoto (JP); Naoki Fukada, Kyoto (JP); Manabu Takehara, Kyoto (JP); Nobuhiro Sumiyoshi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 333 days.

(21) Appl. No.: 18/491,457

(22) Filed: Oct. 20, 2023

(65) Prior Publication Data

US 2024/0252926 A1 Aug. 1, 2024

(30) Foreign Application Priority Data

Feb. 1, 2023 (JP) ................................ 2023-013964

(51) Int. Cl.
*A63F 13/577* (2014.01)
*A63F 13/55* (2014.01)
(Continued)

(52) U.S. Cl.
CPC ............ *A63F 13/577* (2014.09); *A63F 13/55* (2014.09); *A63F 13/56* (2014.09); *A63F 13/57* (2014.09);
(Continued)

(58) Field of Classification Search
CPC .......... A63F 13/63; A63F 13/56; A63F 13/52; A63F 13/577; A63F 13/69; A63F 13/822;
(Continued)

(56) References Cited

U.S. PATENT DOCUMENTS 6,290,565 B1 * 9/2001 Galyean III ............. A63H 3/16 446/99
7,755,620 B2 * 7/2010 Scherer ................... G06T 19/00 345/157
(Continued)

FOREIGN PATENT DOCUMENTS

JP 2006-130131 5/2006
JP 2020-507362 3/2020
(Continued)

OTHER PUBLICATIONS

"Fallout 4—Base building for beginners (new gameplay)." Eurogamer. Nov. 9, 2015. YouTube. <https://www.youtube.com/watch?v=MvgEA2LDNWM> (Year: 2015).*
(Continued)

*Primary Examiner* — William H Mcculloch, Jr.
(74) *Attorney, Agent, or Firm* — Nixon & Vanderhye PC

(57) ABSTRACT

An example game program of the present exemplary embodiment causes the computer to: perform movement control of at least one operation target object set as a target of a first action by the player character, out of a plurality of objects in the virtual space, based on the first action based on an operation input; perform movement control of an operation target building object, based on the first action in a first situation; at a time of shifting from the first situation to a second situation, set the operation target building object arranged to a non-operation target building object.

34 Claims, 19 Drawing Sheets

(51) Int. Cl.

| | |
|---|---|
| ***A63F 13/56*** | (2014.01) |
| ***A63F 13/57*** | (2014.01) |
| ***A63F 13/60*** | (2014.01) |
| ***A63F 13/63*** | (2014.01) |
| ***A63F 13/69*** | (2014.01) |
| ***A63F 13/80*** | (2014.01) |
| ***A63F 13/822*** | (2014.01) |
| *A63F 13/52* | (2014.01) |
| *A63F 13/5375* | (2014.01) |

(52) U.S. Cl.
CPC .............. *A63F 13/60* (2014.09); *A63F 13/63* (2014.09); *A63F 13/69* (2014.09); *A63F 13/80* (2014.09); *A63F 13/822* (2014.09); *A63F 13/52* (2014.09); *A63F 13/5375* (2014.09); *A63F 2300/64* (2013.01); *A63F 2300/66* (2013.01)

(58) Field of Classification Search
CPC ...... A63F 13/55; A63F 13/57; A63F 13/5375; A63F 13/60; A63F 13/80; A63F 2300/64; A63F 2300/66
See application file for complete search history.

(56) References Cited

U.S. PATENT DOCUMENTS

| | | | | |
|---|---|---|---|---|
| 7,874,921 | B2 * | 1/2011 | Baszucki | A63F 13/63 463/2 |
| 8,751,950 | B2 * | 6/2014 | Loberg | G06T 15/00 715/765 |
| 9,555,326 | B2 * | 1/2017 | Scott | A63F 13/245 |
| 9,595,108 | B2 * | 3/2017 | Horovitz | G06V 20/647 |
| 9,773,074 | B2 * | 9/2017 | Balon | A63F 13/50 |
| 10,583,354 | B2 * | 3/2020 | Muthyala | A63H 33/042 |
| 11,083,968 | B2 * | 8/2021 | Walker | A63F 13/213 |
| 11,144,114 | B2 * | 10/2021 | Suzuki | G06F 3/017 |
| 11,192,027 | B2 * | 12/2021 | Kojima | A63F 13/795 |
| 11,433,310 | B2 * | 9/2022 | Walker | A63F 13/63 |
| 11,478,708 | B1 * | 10/2022 | Holm | A63F 13/577 |
| 11,583,774 | B2 * | 2/2023 | Døssing | A63F 13/69 |
| 11,675,488 | B2 * | 6/2023 | Qiu | G06F 3/0488 345/173 |
| 12,097,432 | B2 * | 9/2024 | Timmins | A63F 13/573 |
| 12,151,166 | B2 * | 11/2024 | Bakalash | A63F 13/70 |
| 12,208,326 | B2 * | 1/2025 | Peng | A63F 13/52 |
| 12,220,643 | B2 * | 2/2025 | Bakalash | A63F 13/65 |
| 12,343,636 | B2 * | 7/2025 | Bakalash | G06N 3/047 |
| 2002/0196250 | A1 * | 12/2002 | Anderson | A63H 33/042 345/420 |
| 2006/0258447 | A1 * | 11/2006 | Baszucki | A63F 13/335 463/31 |
| 2007/0063997 | A1 * | 3/2007 | Scherer | G06F 3/04845 345/419 |
| 2011/0087479 | A1 * | 4/2011 | Baszucki | A63F 13/63 703/22 |
| 2014/0163930 | A1 * | 6/2014 | Balon | A63F 13/12 703/1 |
| 2020/0269135 | A1 | 8/2020 | Sensui et al. | |
| 2020/0316466 | A1 | 10/2020 | Wan et al. | |
| 2020/0316476 | A1 | 10/2020 | Wan et al. | |
| 2021/0232299 | A1 * | 7/2021 | Qiu | A63F 13/533 |
| 2021/0370175 | A1 | 12/2021 | Sato et al. | |
| 2022/0366813 | A1 * | 11/2022 | Shaw | A63H 33/044 |
| 2023/0065252 | A1 * | 3/2023 | Døssing | A63F 13/65 |
| 2023/0158405 | A1 * | 5/2023 | Holm | G06F 3/04815 |
| 2023/0277935 | A1 * | 9/2023 | Fukada | A63F 13/426 463/31 |
| 2023/0277936 | A1 * | 9/2023 | Fukada | A63F 13/69 463/31 |
| 2023/0277940 | A1 * | 9/2023 | Fukada | A63F 13/45 463/31 |
| 2023/0277941 | A1 * | 9/2023 | Fukada | A63F 13/5375 463/31 |
| 2024/0050854 | A1 * | 2/2024 | Bakalash | G06N 3/045 |
| 2024/0165520 | A1 * | 5/2024 | Bakalash | A63F 13/655 |
| 2024/0252926 | A1 * | 8/2024 | Yamamoto | A63F 13/56 |
| 2024/0331254 | A1 * | 10/2024 | An | G06T 13/40 |
| 2024/0342603 | A1 * | 10/2024 | Kawamura | A63F 13/45 |
| 2024/0350917 | A1 * | 10/2024 | Fukada | A63F 13/56 |
| 2024/0350921 | A1 * | 10/2024 | Sato | A63F 13/56 |

FOREIGN PATENT DOCUMENTS

| | | |
|---|---|---|
| JP | 2020-130797 | 8/2020 |
| JP | 2021-507791 | 2/2021 |
| JP | 2021-186370 | 12/2021 |
| JP | 2022-096948 | 6/2022 |

OTHER PUBLICATIONS

"The Legend of Zelda: Breath of the Wild", [online], Year 2022, Nintendo of America, [searched on Jan. 13, 2023], internet URL: https://www.zelda.com/breath-of-the-wild/ (4 pages).

Mar. 21, 2024 Office Action issued in Japanese Patent Application No. 2023-013964, pp. 1-3 [machine translation included].

[Breath of the Wild] How to conquer and solve the "Shrine of Ma Ohne—The Power of Magnetism" trial! GameStage@game news flash, Mar. 10, 2017, [Searched on Mar. 14, 2024], Internet: URL:https://blog.gamestage.jp/archives/1336 pages.

100% Mook Series Game Strategy Encyclopedia vol. 24 Fortnite Super Technique Master, vol. 24, Shinyusha Co., Ltd., Yoshitaka Takeda, Aug. 1, 2021, pp. 102-111.

New work "Ghost Giant" for PS VR announced! Will it be a game where animals and huge ghosts deepen their bonds? ,Famitsu.com, Jun. 10, 2018, [Searched on Mar. 14, 2024], Internet: URL:https://www.famitsu.com/news/201806/10158751.html pp. 1-4.

* cited by examiner

FIG. 12

| UNIT NAME | Size/Shape | Characteristic |
|---|---|---|
| Unit A | W. 2 x H. 1 x D. 2 Room with square floor surface | Room Unit. Table and chair arranged in center of room. |
| Unit B | W. 2 x H. 1 x D. 1 Room with rectangular floor surface | Room Unit. Bed is arranged. |
| Unit C | W. 2 x H. 1 x D. 1 Room with rectangular floor surface | Room Unit. Stand for displaying items is arranged. |
| Unit D | W. 1 x H. 1 x D. 1 Staircase shape | stairs |
| Unit E | W. 1 x H. 1 x D. 1 Room with triangular bottom | Room Unit. Triangular Room. |
| Unit F | W. 2 x H. 1/4 x D. 2 Pond with L-shaped bottom | Garden pond unit. There is Water, fish are swimming. |

NON-TRANSITORY COMPUTER-READABLE STORAGE MEDIUM FOR BUILDING MODE WITH CORRESPONDING SYSTEM, APPARATUS, AND METHOD

CROSS REFERENCE TO RELATED APPLICATION

This application claims priority to Japanese Patent Application No. 2023-13964 filed on Feb. 1, 2023, the entire contents of which are incorporated herein by reference.

FIELD

An exemplary embodiment relates to a non-transitory computer-readable storage medium having stored a game program, an information processing system, an information processing apparatus, and an information processing method.

BACKGROUND AND SUMMARY

In a traditional game, a player character could purchase a house and add a facility.

However, in such a game, the player character could not change the arrangement of buildings, or the like. To change the arrangement of buildings, or the like, it is assumed that a dedicated user interface would need to be provided.

Therefore, an object of the present exemplary embodiment is to provide a game program, an information processing system, an information processing apparatus, and an information processing method which enables a building to be built in a simple configuration by using a player character action to move an object for also moving a building in a situation of building a building in a game.

To achieve the above-described object, this exemplary embodiment adopts a configuration as described below.

(First Configuration)

A game program related to a first configuration causes a computer of an information processing apparatus to perform control of a player character in a virtual space based on an operation input, and perform movement control of at least one operation target object set as a target of a first action by the player character, out of a plurality of objects in the virtual space, based on the first action based on an operation input. Further, the game program further causes the computer to: perform movement control of at least one operation target building object that is a building object set as the operation target, based on the first action in a first situation, at a time of shifting from the first situation to a second situation, set the operation target building object arranged to a non-operation target building object that is a building object corresponding to the operation target building object and that is not a target of the first action, and at a time of shifting from the second situation to the first situation, set the non-operation target building object arranged to the operation target building object corresponding to the non-operation target building object.

According to the above, the movement control of the operation target building object can be performed based on the first action by the player character for performing movement control of the operation target object in the virtual space, during the first situation. At a time of shifting from the first situation to the second situation, the operation target object can be set to the non-operation target building object. This way the building objects can be also moved based on the first action, and editing of buildings is possible with a simple structure in a game with the first action. Further, since the building object can be set to a non-operation target building object in the second situation, it is possible to restrict the building object from being moved based on the first action.

(Second Configuration)

A second configuration is the above first configuration adapted so as to cause the computer to connect a plurality of the operation target building objects to each other and integrate the operation target building objects connected and perform movement control of the operation target building objects integrated, as the first action based on the operation input.

According to the above, a plurality of the operation target building objects can be connected and integrated into a single object, making it easy to perform movement control of the building objects.

(Third Configuration)

A third configuration may be the above second configuration adapted so that the operation target building objects each have a connection point with a connection direction set thereto. The configuration may cause the computer to adjust positions and postures of the operation target building objects so that their connection points are connected base on their connection directions, when connecting the operation target building objects to each other.

According to the above, the position and the posture of the operation target building objects are adjusted so that the operation target building objects are easily connectable to each other.

(Fourth Configuration)

A fourth configuration may be the above second or third configuration adapted so that at least any of a plurality of building objects is an object of a room constituting a building.

According to the above, a building object having a room can be constructed.

(Fifth Configuration)

A fifth configuration may be the fourth configuration adapted so that the non-operation target building object that is the object of the room has a shape that is subjectable to collision determination and allows the player character to enter inside the room. The operation target building object that is the object of the room may have a shape that is subjectable to collision determination and does not allow the player character to enter inside the room.

According to the above, the player character is able to enter inside the room of the non-operation target building object, and the operation target building object is able to restrict the player character from entering inside the room. This blocks the player character from entering inside the room while the building object is under construction.

(Sixth Configuration)

The sixth configuration may be the above fifth configuration adapted so that the operation target building object that is the object of the room has a blocking object that blocks an opening of the room, at a location corresponding to the opening.

According to the above, it is possible to restrict the player character from entering inside the room of the operation target building object.

(Seventh Configuration)

A seventh configuration may be the above fifth or sixth configuration adapted so as to cause the computer to move the player character to a destination as a second action of the player character based on an operation input, if there is an object that serves as a ceiling above the player character and the destination to which the player character can be arranged further above the object serving as the ceiling. The player character cannot be arranged inside the room of the operation target building object.

According to the above, the second action allows the player character to move through the object that serves as the ceiling, and the second action also prohibits the player character from being arranged inside the room of the operation target building object that is under construction.

(Eighth Configuration)

An eighth configuration may be any of the above first to seventh configurations adapted so that at least any of non-operation target building objects has an interior object arranged in its interior space. The configuration may further cause the computer to disable a predetermined type of the interior object if the posture of the non-operation target building object having the interior object meets a predetermined condition.

According to the above, the interior object can be arranged in the interior space of the building object, and if the posture of the building object meets the predetermined condition, the interior object can be disabled. For example, if the building object is inclined, the interior object may not be displayed so as not to cause a sense of wrongness.

(Ninth Configuration)

A ninth configuration may be the above eighth configuration adapted so as to cause the computer to disable, by erasing, the predetermined type of interior object.

According to the above, if the posture of the building object meets the predetermined condition, the interior object can be erased.

(Tenth Configuration)

A tenth configuration may be any of the above first to ninth configurations adapted so as to cause the computer to connect a plurality of the operation target objects except for a combination of an operation target building object and an operation target object other than the operation target building object, integrate the operation target objects connected and perform movement control of the operation input objects integrated, as the first action based on the operation input.

According to the above, a plurality of operation target objects can be connected to each other, except for a combination of an operation target building object and an operation target object other than the operation target building object. This way, the movement control of the operation target building object is not distracted, and a building object can be easily constructed.

(Eleventh Configuration)

An eleventh configuration may be any of the above second to tenth configurations adapted so as to cause the computer to arrange a connection object at the connecting positions of a plurality of the operation target building objects if the plurality of the operation target building objects are brought in a state of being connectable to each other. The connection object may not be arranged at the connecting positions if a plurality of connected operation target building objects are set to the non-operation target building objects.

According to the above, the connection object can be arranged, during construction of the building objects, to allow the player recognize the connecting positions of the plurality of operation target building objects. For non-operation target building objects, the visibility of the building objects can be improved because the connection objects is not placed at the connecting positions.

Other configurations may be an information processing systems, an information processing apparatus, or an information processing methods.

According to this exemplary embodiment, the movement control of the operation target building object can be performed based on the first action by the player character for performing movement control of the operation target object in the virtual space, and a building object can be constructed with a simple configuration.

These and other objects, features, aspects and advantages will become more apparent from the following detailed description when taken in conjunction with the accompanying drawings.

BRIEF DESCRIPTION OF THE DRAWINGS

FIG. 12 is an example non-limiting diagram showing a plurality of exemplary types of building units provided in the game of this exemplary embodiment.

DETAILED DESCRIPTION OF NON-LIMITING EXAMPLE EMBODIMENTS (Game System Configuration)

Figure 1:
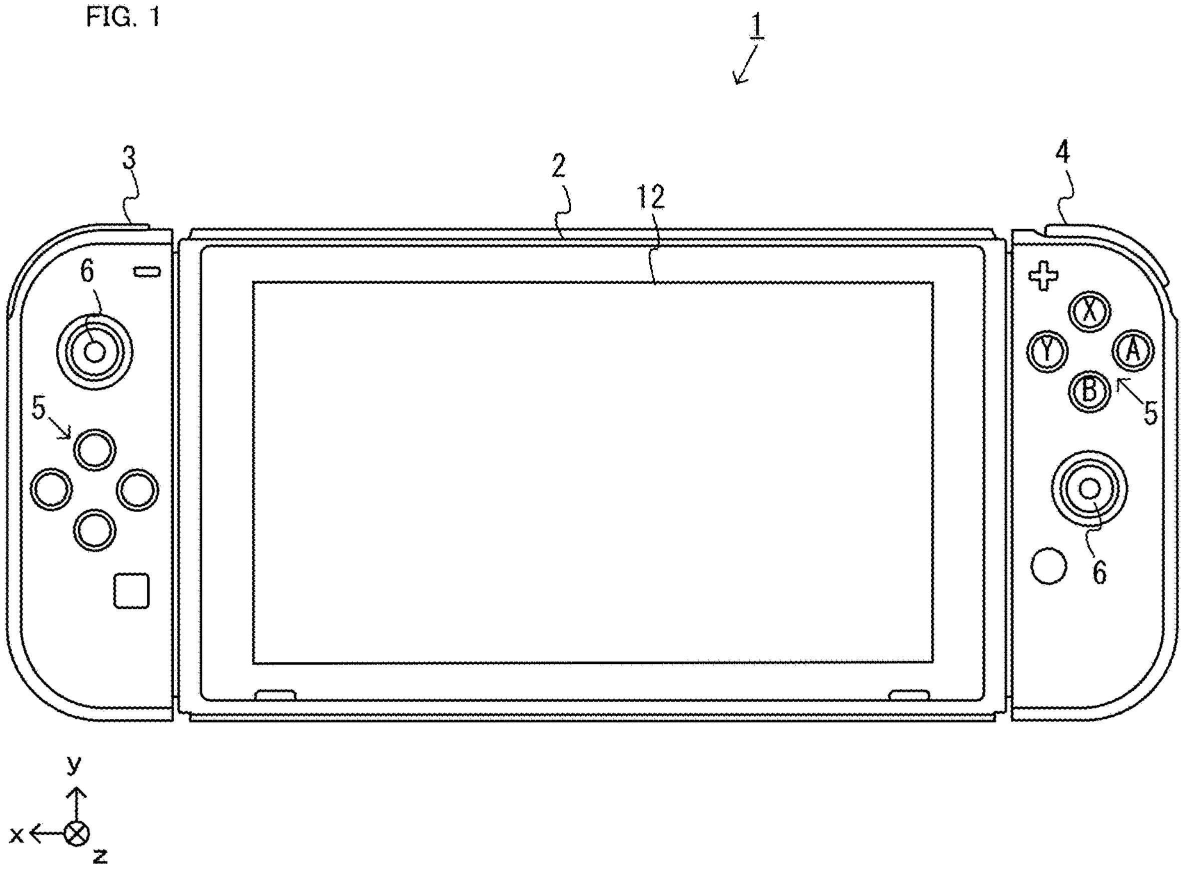
FIG. 1 is an example non-limiting diagram of a game system.

A game system according to an example of an exemplary embodiment is described below. FIG. 1 is a diagram showing an exemplary game system. An example of a game system 1 according to the exemplary embodiment includes a main body apparatus (an information processing apparatus; which functions as a game apparatus main body in the exemplary embodiment) 2, a left controller 3, and a right controller 4. The main body apparatus 2 is an apparatus for performing various processes (e.g., game processing) in the game system 1. The left controller 3 and the right controller 4 each include a plurality of buttons 5 (A-button, B-button, X-button, Y-button) and an analog stick 6, as exemplary operation units through which a user performs input.

Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2, or the main body apparatus 2, the left controller 3, and the right controller 4 may be separated from one another, when being used. It should be noted that hereinafter, the left controller 3 and the right controller 4 will occasionally be referred to collectively as a "controller".

Figure 2:
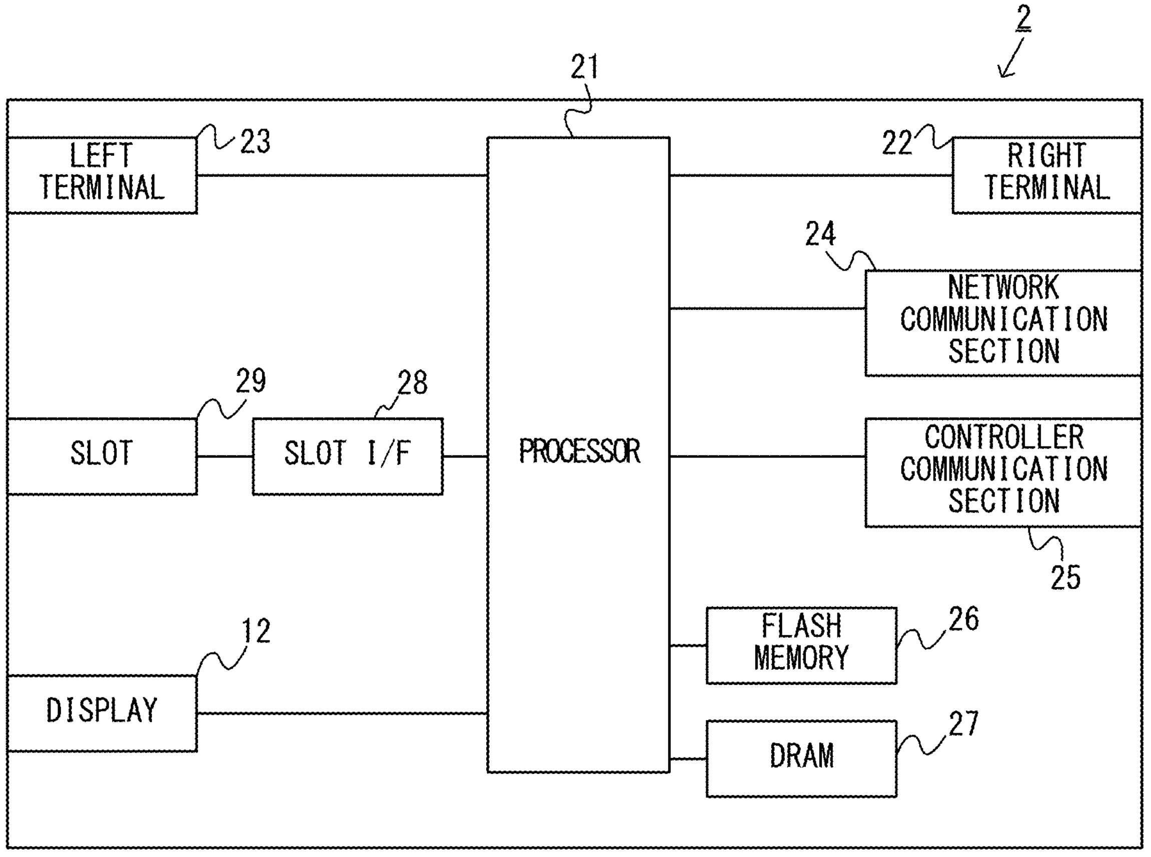
FIG. 2 is an example non-limiting block diagram showing an exemplary internal configuration of the main body apparatus 2.

FIG. 2 is a block diagram showing an example of the internal configuration of the main body apparatus 2. As shown in FIG. 2, the main body apparatus 2 includes a processor 21. The processor 21 is an information processing section for executing various types of information processing (e.g., game processing) to be executed by the main body apparatus 2, and for example, includes a CPU (Central Processing Unit) and a GPU (Graphics Processing Unit). Note that the processor 21 may be configured only by a CPU, or may be configured by a SoC (System-on-a-Chip) that includes a plurality of functions such as a CPU function and a GPU function. The processor 21 executes an information processing program (e.g., a game program) stored in a storage section (specifically, an internal storage medium such as a flash memory 26, an external storage medium attached to the slot 29, or the like), thereby performing the various types of information processing.

Further, the main body apparatus 2 also includes a display 12. The display 12 displays an image generated by the main body apparatus 2. In the exemplary embodiment, the display 12 is a liquid crystal display device (LCD). The display 12, however, may be a display device of any type. The display 12 is connected to the processor 21. The processor 21 displays a generated image (e.g., an image generated by executing the above information processing) and/or an externally acquired image on the display 12.

Further, the main body apparatus 2 includes a left terminal 23, which is a terminal for the main body apparatus 2 to perform wired communication with the left controller 3, and a right terminal 22, which is a terminal for the main body apparatus 2 to perform wired communication with the right controller 4.

Further, the main body apparatus 2 includes a flash memory 26 and a DRAM (Dynamic Random Access Memory) 27 as examples of internal storage media built into the main body apparatus 2. The flash memory 26 and the DRAM 27 are connected to the processor 21. The flash memory 26 is a memory mainly used to store various data (or programs) to be saved in the main body apparatus 2. The DRAM 27 is a memory used to temporarily store various data used for information processing.

The main body apparatus 2 includes a slot 29. The slot 29 is so shaped as to allow a predetermined type of storage medium to be attached to the slot 29. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of a game application or the like) used by the main body apparatus 2 and/or a program (e.g., a game program or the like) executed by the main body apparatus 2.

The main body apparatus 2 includes a slot interface (hereinafter abbreviated as "I/F") 28. The slot I/F 28 is connected to the processor 21. The slot I/F 28 is connected to the slot 29, and in accordance with an instruction from the processor 21, reads and writes data from and to the predetermined type of storage medium (e.g., a dedicated memory card) attached to the slot 29.

The processor 21 appropriately reads and writes data from and to the flash memory 26, the DRAM 27, and each of the above storage media, thereby performing the above information processing.

The main body apparatus 2 includes a network communication section 24. The network communication section 24 is connected to the processor 21. The network communication section 24 performs wired or wireless communication with an external apparatus via a network. In the exemplary embodiment, as a first communication form, the network communication section 24 connects to a wireless LAN and communicates with an external apparatus, using a method compliant with the Wi-Fi standard. Further, as a second communication form, the network communication section 24 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 25. The controller communication section 25 is connected to the processor 21. The controller communication section 25 wirelessly communicates with the left controller 3 and/or the right controller 4. The communication method between the main body apparatus 2 and the left controller 3 and the right controller 4 is optional. In the exemplary embodiment, the controller communication section 25 performs communication compliant with the Bluetooth (registered trademark) standard with the left controller 3 and with the right controller 4.

The processor 21 is connected to the left terminal 23 and the right terminal 22. When performing wired communication with the left controller 3, the processor 21 transmits data to the left controller 3 via the left terminal 23 and also receives operation data from the left controller 3 via the left terminal 23. Further, when performing wired communication with the right controller 4, the processor 21 transmits data to the right controller 4 via the right terminal 22 and also receives operation data from the right controller 4 via the right terminal 22. As described above, in the exemplary embodiment, the main body apparatus 2 can perform both wired communication and wireless communication with each of the left controller 3 and the right controller 4.

It should be noted that, in addition to the elements shown in FIG. 2, the main body apparatus 2 includes a battery that supplies power and an output terminal for outputting images and audio to a display device (e.g., a television) separate from the display 12.

(Overview of Game)

The following describes a game of this exemplary embodiment. In the game of this exemplary embodiment, the player character PC is placed in a three-dimensional virtual space (game space), and the game progresses when the player character PC moves in the virtual space, performs predetermined actions, defeats enemy characters, or talks with non-player characters that are different from enemy characters.

Figure 3:
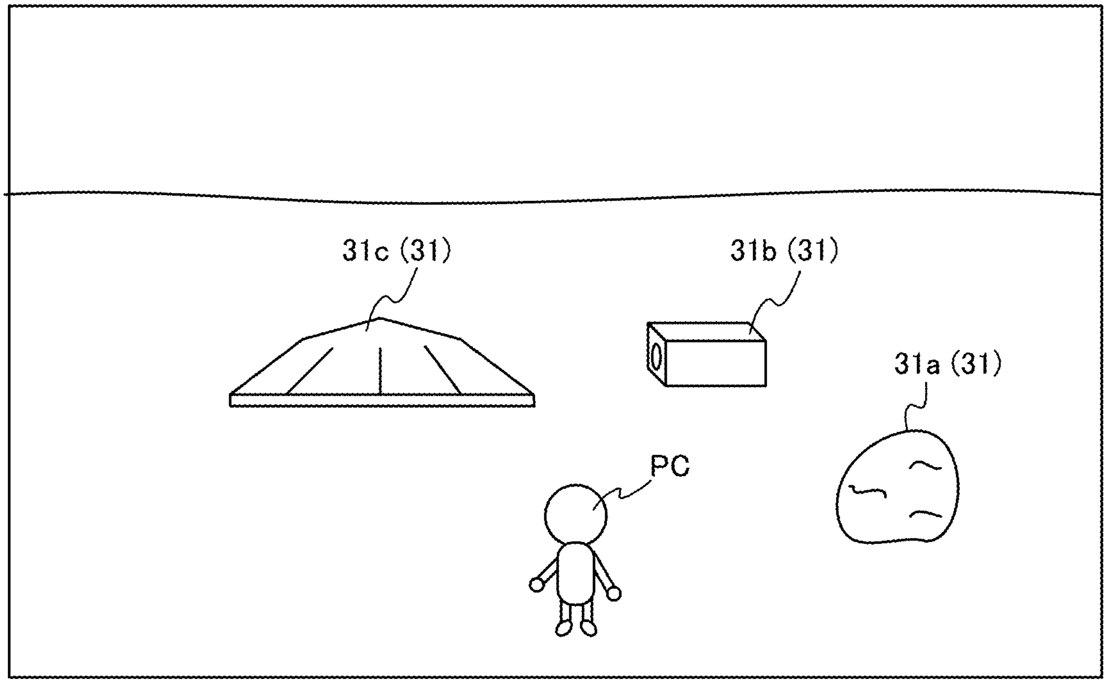
FIG. 3 is an example non-limiting diagram showing an exemplary game image displayed in a case where a game of an exemplary embodiment is executed.

FIG. 3 is a diagram showing an exemplary game image displayed when a game of this exemplary embodiment is executed. The virtual space has virtual gravity working vertically downward, and a ground is provided vertically to this gravity. As shown in FIG. 3, a player character PC and a plurality of virtual objects 31 (e.g., 31*a*-31*c*) are placed on the ground in the virtual space.

The player character PC is a character controllable by the player. The player character PC moves in the virtual space or performs a predetermined actions in the virtual space based on the operation input to the controller (3 or 4). The player character PC can perform a first action as the predetermined action. The first action is an action that remotely controls an object in front of the player character PC.

Specifically, the player character PC performs the first action based on an operation input by the player, and movement control of the operation target object that is the target of the first action arranged in the virtual space is performed. Based on the first action, the posture of the operation target object is controlled. Further, based on the first action, a plurality of operation target objects are connected to and integrated with each other to generate an assembled object in which the plurality of operation target objects are assembled.

The plurality of virtual objects 31 (e.g., 31*a* to 31*c*) shown in FIG. 3 are examples of the operation target objects. Note that the virtual space also includes non-operable target objects that are not targets of the first action. Examples of the non-operable target object include a terrain object such as a rock, mountain, a building, or ground, which are fixed in the virtual space. Further, the virtual space includes building objects, which are the targets of the first action, as described in detail below.

At least any one of the plurality of virtual objects 31 may be arranged in advance in the virtual space. At least any one of the plurality of virtual objects 31 may be owned by the player character PC and arranged in the virtual space in response to an operation input by the player.

For example, the plurality of virtual objects 31 includes a rock object 31*a*, an engine object 31*b*, and a wing object 31*c*. In addition to these, there may be plurality of other virtual objects 31 that are the targets of the first action.

The rock object 31*a* is an object that simulates a rock. Further, the engine object 31*b* is an object that simulates a jet engine and is a virtual object having power. The wing object 31*c* is a virtual object for flying in the sky, and generates a lifting force when moved in the virtual space at a predetermined speed or faster. Movements of these virtual objects 31*a* to 31*c* are controlled in the virtual space based on the first action.

Figure 4:
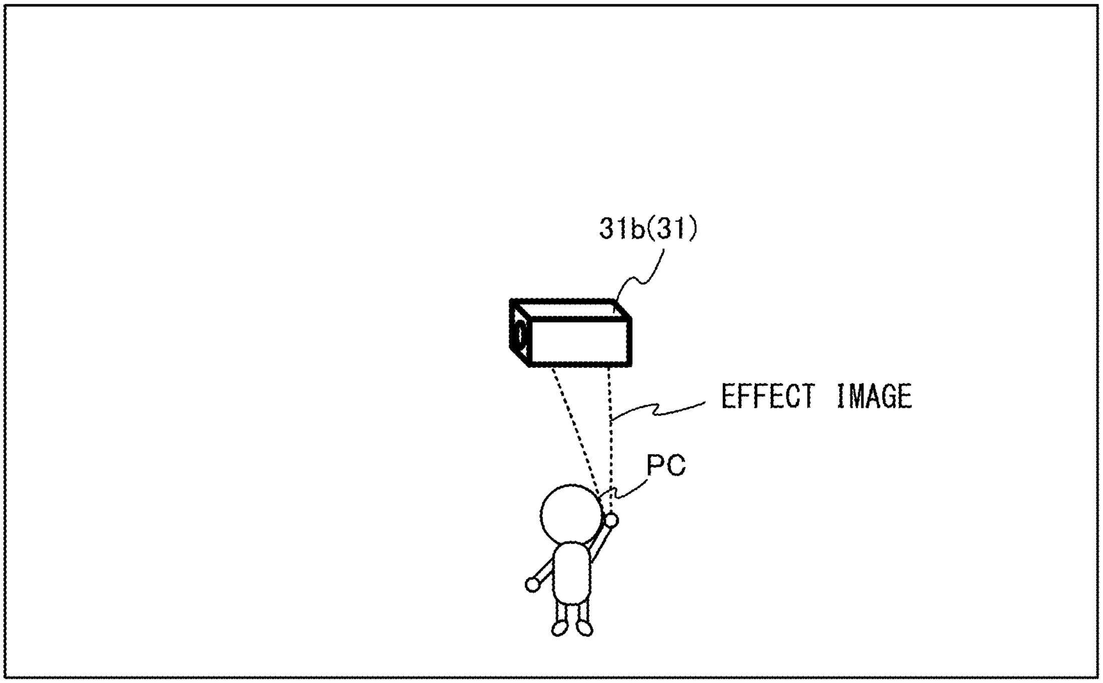
FIG. 4 is an example non-limiting diagram showing an exemplary game image when the first action is being performed by the player character PC.

FIG. 4 is a diagram showing an exemplary game image when the first action is being performed by the player character PC.

When a predetermined operation input is made for the first action, any of the plurality of virtual objects 31 that are the operation target objects is selected, and movement of the selected virtual object 31 is controlled based on the first action. As shown in FIG. 4, for example, when a predetermined button on the controller is pressed, any of the plurality of virtual objects 31 is selected and a first action is performed on the selected virtual object. For example, when the engine object 31*b* is selected and the first action is performed on the engine object 31*b*, the display mode of the engine object 31*b* changes and an effect image indicating that the first action is being performed (e.g., a beam-like image from the player character PC to the engine object 31*b*) is displayed. In this state, the engine object 31*b* is floating off the ground in the virtual space. If the player character PC moves in the virtual space in response to an operation input to the analog stick of the controller in this state, for example, the engine object 31*b* also moves in the virtual space according to the movement of the player character PC. For example, while the positional relationship between the player character PC and the engine object 31*b* is maintained, the engine object 31*b* moves according to the movement of the player character PC. When the engine object 31*b* is moved and approaches the wing object 31*c*, the engine object 31*b* and the wing object 31*c* are connected and integrated.

Figure 5:
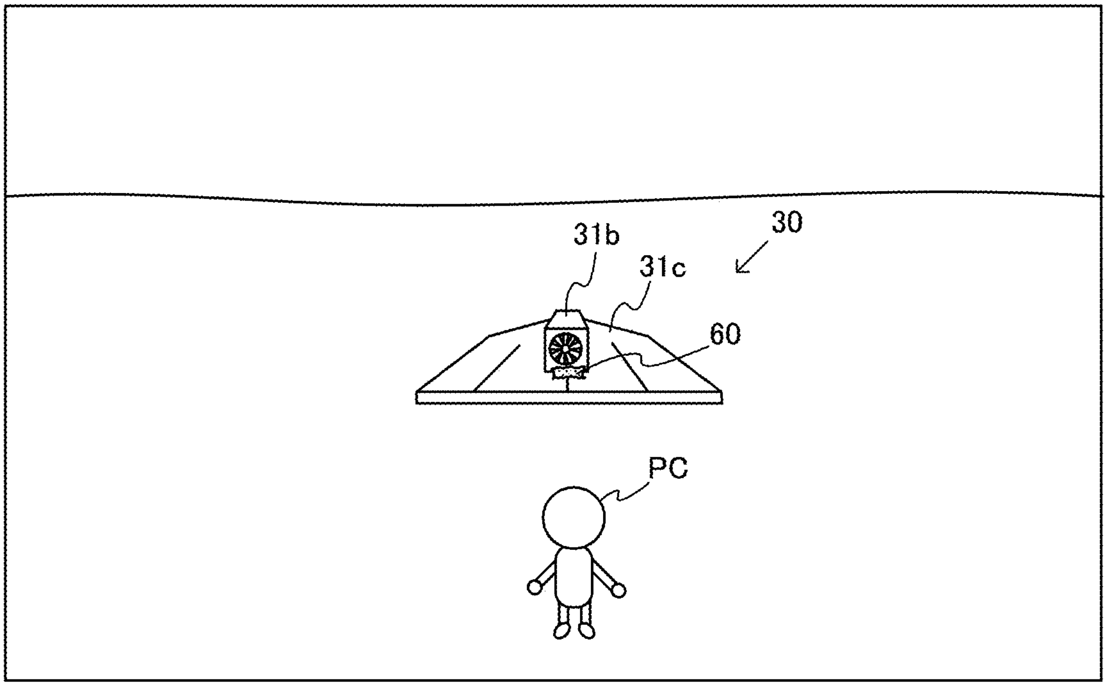
FIG. 5 is an example non-limiting diagram showing an exemplary game image after an engine object 31*b* and a wing object 31*c* are connected and integrated as an airplane object 30.

FIG. 5 is a diagram showing an exemplary game image after the engine object 31*b* and the wing object 31*c* are connected and integrated as an airplane object 30.

As shown in FIG. 5, when the engine object 31*b* is arranged on top of the wing object 31*c* and these objects 31*b* and 31*c* are connected, an airplane object 30 as an example assembled object is generated. A connection object 60 is arranged between the engine object 31*b* and the wing object 31*c* to indicate that these objects are connected and the connecting position. The connection object 60 is, for example, an object simulating a glue. The player may further connect other virtual objects 31 to the generated airplane object 30.

Movements of the engine object 31*b* and the wing object 31*c* (airplane object 30) connected by the connection object 60 are controlled as a whole based on the first action. The engine object 31*b* and the wing object 31*c* (airplane object 30) connected by the connection object 60 are posture-controlled as a single unit based on the first action. If a predetermined operation input is performed for the first action after the airplane object 30 is generated, for example, the engine object 31*b* is selected, and the first action for the engine object 31*b* is performed. In this case, the display mode of the engine object 31*b* changes and an effect image indicating that the first action is being performed is displayed. When the player character PC moves during this state, the engine object 31*b* and the wing object 31*c* move as a single unit according to such a movement. When the engine object 31*b* is rotated based on the first action, the engine object 31*b* and the wing object 31*c* are rotated as a single unit.

The airplane object 30 with the engine object 31*b* and the wing object 31*c* integrated is configured to be movable in the virtual space without the first action. For example, when the player character PC performs a predetermined action on the engine object 31B, the engine object 31B generates thrust. This thrust allows the airplane object 30 to fly in the virtual space. The player character PC can board the airplane object 30 and fly in the virtual space.

Thus, in the game of this exemplary embodiment, based on the first action of the player character PC, the movement and the posture of the virtual object 31 (an example operation target object) that is the target of the first action can be controlled in the virtual space. On the other hand, the movements and the postures of the non-operable target objects such as terrain objects (objects fixed in the virtual space such as a rock, a mountain, a building, ground, or the like) cannot be controlled based on the first action.

(Construction of Buildings)

In the game of this exemplary embodiment, a building (e.g., a house of the player character PC) can be constructed based on the first action of the player character PC. The "building" may include houses, buildings, stores, gardens, castles, gates, statues, monuments, and the like. The following describes construction of buildings.

Figure 6:
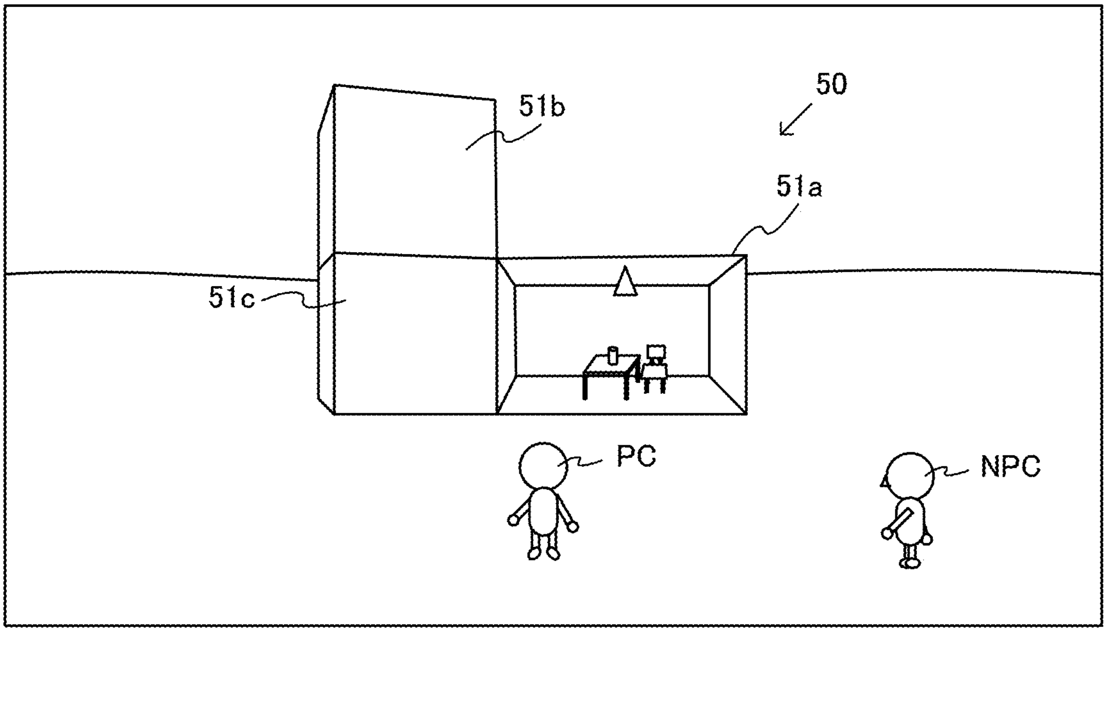
FIG. 6 is an example non-limiting diagram showing an exemplary building placed in a predetermined area of a virtual space in a normal game mode.

FIG. 6 is a diagram showing an example building object arranged in a predetermined area of the virtual space in the normal game mode.

For example, there is a predetermined area in the virtual space where building objects 50 are arranged. In the normal game mode, the player character PC can move the virtual space and enter the building objects 50 (e.g., the house of the player character PC) arranged in the predetermined area. The building objects 50 includes various rooms and the player character PC can enter each of the rooms and perform various actions.

For example, as shown in FIG. 6, a building object 50 constituted by a building unit 51*a*, a building unit 51*b*, and a building unit 51*c* arranged in a predetermined area. In the normal game mode, the building objects 50 (each of the building units 51*a* to 51*c*) are fixed in the virtual space. The player character PC, for example, can enter inside the room in the building unit 51*a* and perform certain actions. The player character PC can also enter inside the rooms of the building units 51*b* and 51*c* and perform actions. The player character PC can also move over each of the building units 51*a* to 51*c* if there are spaces exist above each of the building units 51*a* to 51*c*. For example, in the example in FIG. 6, the player character PC can move over the building units 51*a* and 51*c*.

In this exemplary embodiment, several other types of building units are available in addition to the building units 51*a* to 51*c*, during the normal game mode. These several types of building units provided during the normal game mode are referred to as "building units 51".

The player character PC cannot perform the first action to the building objects 50 during the normal game mode. In other words, during the normal game mode, the building objects 50 (each of the building units 51) are not the target of the first action, and the movements and the postures of the building objects 50 are not controlled based on the first action. The building objects (building object 50 and each building unit 51) that are not the target of the first action are sometimes referred to as "non-operation target building objects". The building objects 50 are fixed in the virtual space and do not move even if they are hit by objects moving in the virtual space (e.g., airplane objects or rock objects), hit by wind, or if a bomb object explodes in the vicinity, not limited to the first action.

In the game of this exemplary embodiment, the game shifts from the normal game mode to the construction mode based on the operation input by the player, and construction of a building object is enabled. For example, as shown in FIG. 6, a predetermined non-player character NPC exists in the vicinity of a predetermined area of the virtual space and the player character PC talking to the predetermined non-player character NPC causes the game to shift from the normal game mode to the construction mode.

The building objects may be constructable, not only in the predetermined area of the virtual space, but also in any area. The shifting from the normal game mode to the construction mode may take place not only by an event of the player character PC talking to a predetermined non-player character NPC, but also according to any other event. In the normal game mode, initial building objects 50 may be arranged in advance, in a predetermined area. The building objects 50 may not be initially arranged in the normal game mode, and the building objects 50 may be arranged in the virtual space when construction is performed by the player in the construction mode.

Figure 7:
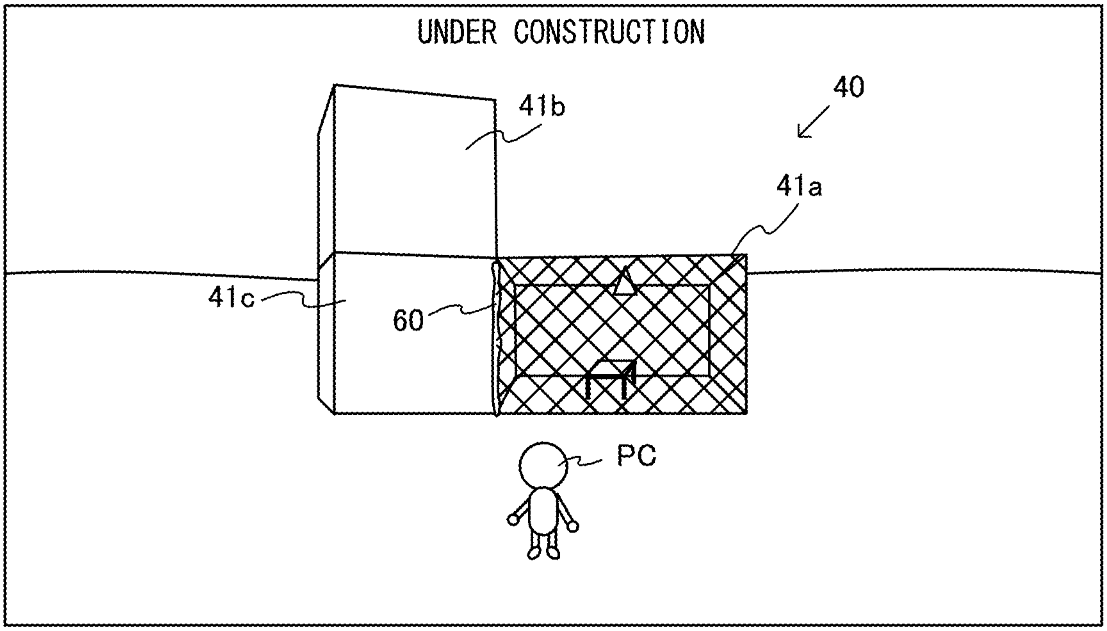
FIG. 7 is an example non-limiting diagram showing an exemplary game image displayed in a construction mode.

FIG. 7 is a diagram showing an exemplary game image displayed in the construction mode. As shown in FIG. 7, for example, the text "under construction" is displayed in the construction mode, which is not displayed in the normal game mode. In the virtual space during the construction mode, the building objects 40 constituted by the building unit 41*a*, the building unit 41*b*, and the building unit 41*c* are arranged in the virtual space. In addition to these building units 41*a* to 41*c*, various other types of building units 41 can be arranged in the virtual space. Examples of each of the building units 41 are described later.

At a time of shifting from the normal game mode to the construction mode, the building objects 50 that are not the target of the first action (non-operation target building objects) are set to the building objects 40 that are the target of the first action. Specifically, in this exemplary embodiment, the building objects 50 used in the normal game mode and the building objects 40 used in the construction mode are provided as building objects. The building objects 40 are different object from the building objects 50, although they have the same shape and size in virtual space and looks almost identical to the building object 50. More specifically, at a time of shifting from the normal game mode to the construction mode, the building unit 51*a* is replaced by the corresponding building unit 41*a*, the building unit 51*b* is replaced by the corresponding building unit 41*b*, and the building unit 51*c* is replaced by the corresponding building unit 41*c*. In other words, the building units 51*a* to 51*c* arranged in the virtual space are replaced by the corresponding building units 41*a* to 41*c*, while maintaining the positional relationship of these objects.

For example, as shown in FIG. 6, the building unit 51*a* is rectangular in shape and has walls on the left and right sides. The left and right walls of the building unit 51*a* are the surfaces in which the collision is determined. Further, the front and rear of the building unit 51*a* are open. Therefore, the player character PC is not able to enter inside the room of the building unit 51*a* through the left and right wall surfaces of the building unit 51*a*, but is able to enter inside the room of the building unit 51*a* from the front and rear openings of the building unit 51*a*. On the other hand, as shown in FIG. 7, the building unit 41*a* is rectangular in shape, with the left and right sides having walls and the front and rear constituted by mesh objects. The left and right walls of building unit 41*a* and the mesh objects are the surfaces in which collisions are determined. Therefore, the player character PC is not able to enter inside the room of the building unit 41*a*. The same applies to other building units 51*b* and 51*c*. In other words, building units 51*b* and 51*c* are replaced by another building unit 41*b* and 41*c*, respectively, at a time of shifting from the normal game mode to the construction mode. The building units 41*b* and 41*c* have approximately the same shape as building units 51*b* and 51*c*, respectively. The building units 41*b* and 41*c* have walls or mesh objects in which the collision is determined and has no openings. Therefore, the player character PC cannot enter inside the building units 41*b* and 41*c*. On the other hand, the building units 51*b* and 51*c* have openings at least partially, and the player character PC can enter inside the building units 51*b* and 51*c*.

The building object 40 is the target of the first action and is configured to allow control of the movement and the posture thereof in the virtual space based on the first action. In the following, the building objects (building object 40 and each of the building units 41) that are the target of the first action are sometimes referred to as the "operation target building object". As shown in FIG. 7, in the construction mode, when each operation target building object is connected, a connection object 60 is arranged between the connected operation target building objects.

Note that the building units 51 used in the normal game mode and the building units 41 used in the construction mode may be the same building object. In other words, the same building unit (a three-dimensional virtual model with a plurality of polygons) may be arranged in the virtual space as a building object in both normal game mode and construction mode. When the same building objects (building units) are used in the normal game mode and the construction mode, they may be displayed in the same display mode or different display modes in the normal game mode and the construction mode.

For example, although the same three-dimensional virtual model is used as a building object in both the normal game mode and the construction mode, the display mode may be different in these modes by switching enable/disable of the display of at least a part of the virtual models according to the mode. Although the same three-dimensional virtual models are used as building objects in both the normal game mode and the construction mode, the display mode may be different in these modes by switching at least a part of the texture image applied to the virtual model according to the mode. Although the same three-dimensional virtual models are used as building objects in both the normal game mode and the construction mode, collision determination may be enabled or disabled for at least a part of the virtual models according to the mode.

For example, the building unit 41*a* may be partially constituted by a mesh object, and as shown in FIG. 7, the display of the mesh object may be enabled and the collision determination of the mesh object may be enabled during the construction mode. This way, the building unit 41*a* may be displayed with mesh on its side during the construction mode, and the player character PC may not be able to enter inside the room of the building unit 41*a*. On the other hand, in the normal game mode, as shown in FIG. 6, the display of the mesh objects forming the sides of the building unit 41*a*, as well as the collision determination of the mesh objects, may be disabled. Thus, in the normal game mode, the sides of the building unit 51*a* may be partially open and the player character PC may be able to enter inside the room of the building unit 51*a* through the openings.

In other words, "a non-operation target building object is set to an operation target building object" at a time of shifting from the normal game mode to the construction mode encompasses a case where a three-dimensional first virtual model representing the non-operation target building object and a three-dimensional second virtual model representing the corresponding operation target building object are prepared as separate sets of data and the first virtual model is replaced by the second virtual model. Further, "a non-operation target building object is set to an operation target building object" encompasses a case where the first virtual model and the second virtual model are arranged in the virtual space and the state where only the first virtual model is active is switched to the state where only the second virtual model is active. Further, "a non-operation target building object is set to an operation target building object" encompasses a case where a single three-dimensional virtual model is prepared as the building object, the display mode and/or the collision determination for the virtual model is/are switched, and the first action for the virtual model is switched from the disabled state to the enabled state. Further, "a non-operation target building object is set to an operation target building object" encompasses a case where a single three-dimensional virtual model is prepared as a building object, and simply the first action for the virtual model is switched from the disabled state to the enabled state, without switching the display mode or the collision determination for the virtual model.

Figure 8:
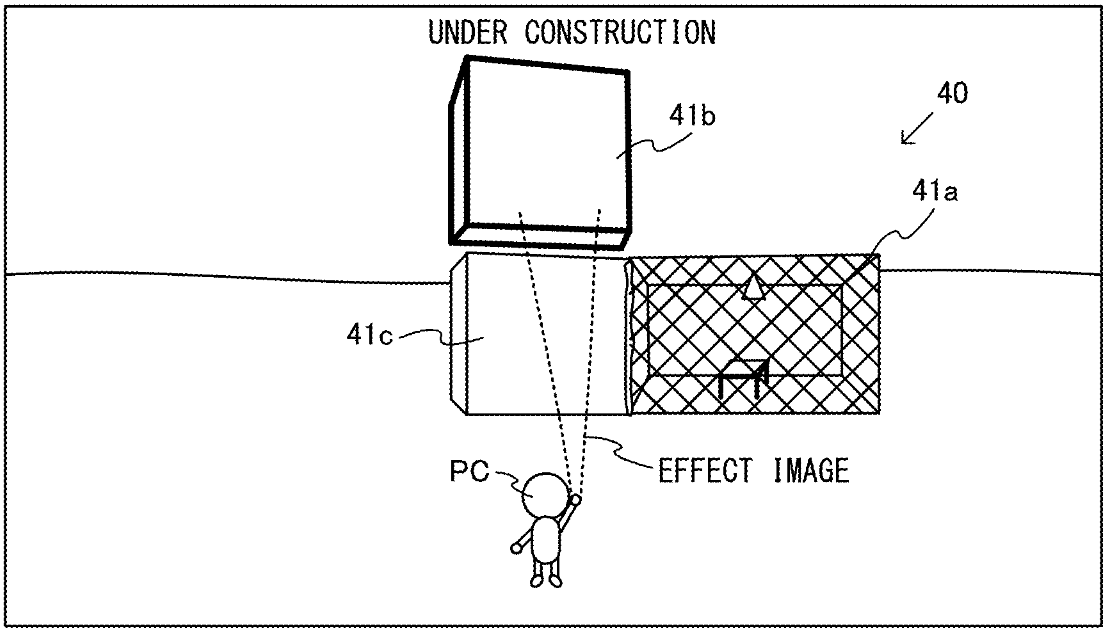
FIG. 8 is an example non-limiting diagram showing an exemplary game image when the first action is being performed on a building object 40.

FIG. 8 is a diagram showing an exemplary game image when the first action is performed on the building objects 40.

As shown in FIG. 8, the first action can be performed on the building objects 40 during the construction mode. As shown in FIG. 8, the first action is performed on the building object 40, as was done on the virtual object 31 during the normal game mode. Specifically, for example, when a predetermined operation input is made during the construction mode, the building unit 41*b* in the building object 40 is selected, and the first action is performed on the selected building unit 41*b*. Since the building unit 41*b* is not connected to other building units 41 by the connection object 60 (since building unit 41*b* is simply placed on building unit 41*c*), the selected building unit 41*b* is separated from the building unit 41*c* and is floating in the air. Further, the display mode of the selected building unit 41*b* is changed and an effect image is shown to indicate that the first action is being performed.

Figure 9:
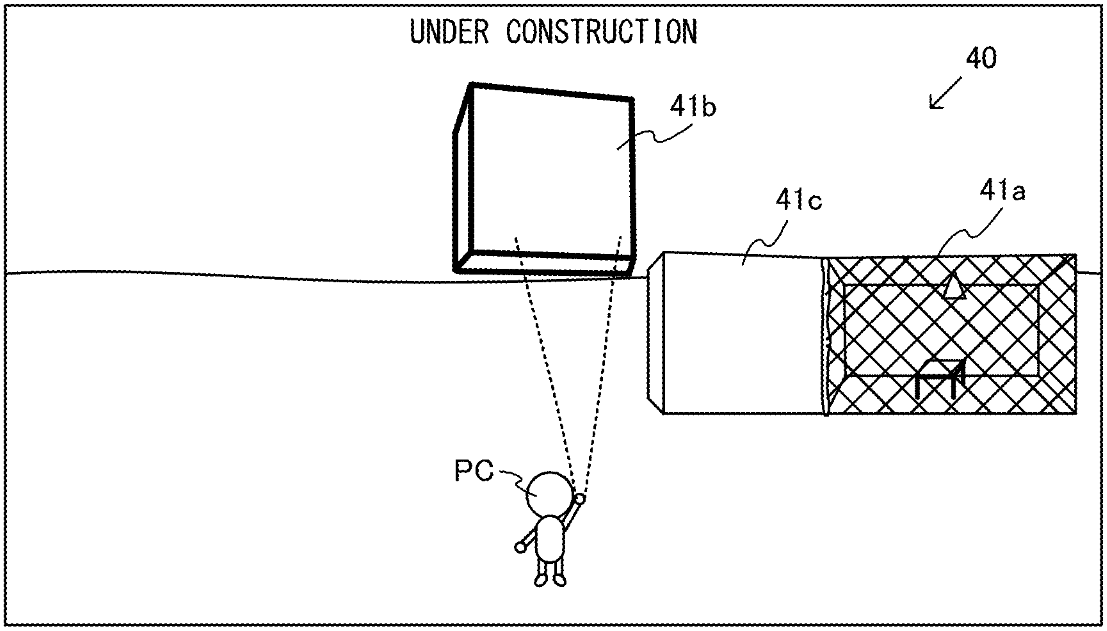
FIG. 9 is an example non-limiting diagram showing an exemplary game image when a building unit 41*b* is being moved based on the first action.
Figure 10:
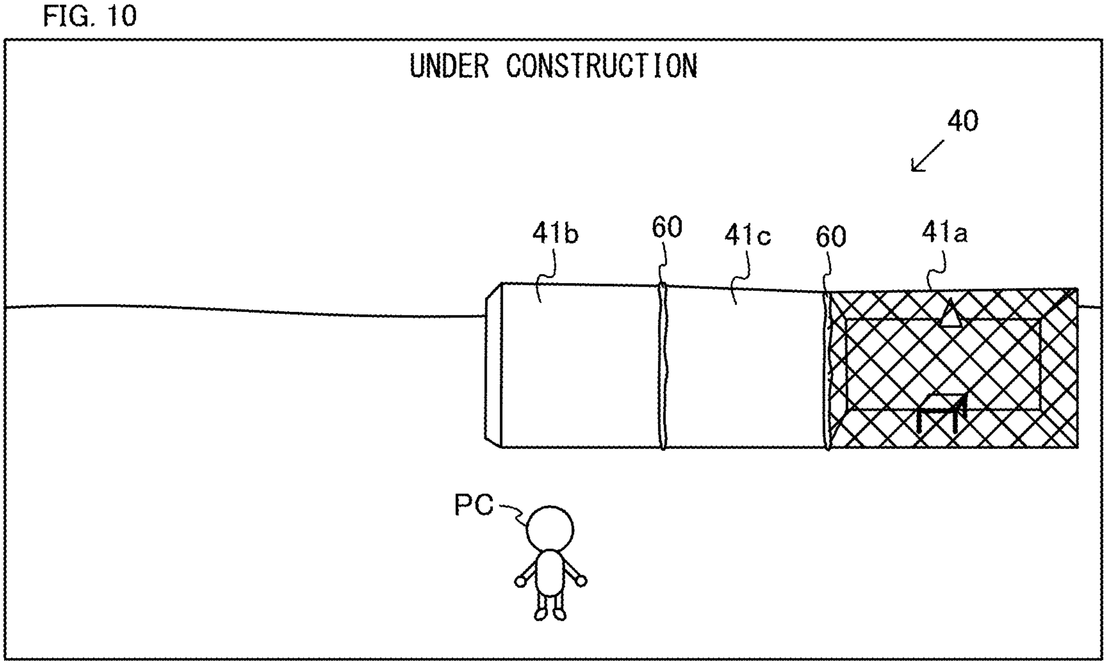
FIG. 10 is an example non-limiting diagram showing an exemplary game image after the building unit 41*b* has been moved based on the first action.

FIG. 9 is a diagram showing an exemplary game image when the building unit 41*b* is being moved based on the first action. FIG. 10 is a diagram showing an exemplary game image after the building unit 41*b* has been moved based on the first action.

If the player character PC moves to the left, for example, based on the operation input in the state shown in FIG. 8, the building unit 41*b* also moves to the left, as shown in FIG. 9. Further, if the building unit 41*b* is moved downward in the state shown in FIG. 9, the left side of the building unit 41*c* is connected to the right side of the building unit 41*b*. This terminates the first action for the building unit 41*b*, and a game image as shown in FIG. 10 will be displayed. When the building unit 41*c* is connected to the building unit 41*b*, a connection object 60 is placed between the building unit 41*c* and the building unit 41*b*.

The connection object 60 is placed between the operation target objects before the connection between the operation target objects is completed. Specifically, the connection object 60 is placed when a plurality of operation target objects meet a predetermined connection conditions. More specifically, a connection object 60 will appear between these operation target objects when a plurality of operation target objects are connectable to each other and the plurality of operation target objects are in a predetermined positional relationship (e.g., the distance therebetween is less than a predetermined value). For example, as shown in FIG. 9, the connection object 60 appears between the right side of the building unit 41*b* and the left side of the building unit 41*c* when the selected building unit 41*b* is moved and the distance between the right side of the building unit 41*b* and the left side of the building unit 41*c* becomes less than a predetermined value. When a predetermined connection instruction is given, the building unit 41*b* is connected to the building unit 41*c*, and the first action on building unit 41*b* is terminated with the connection object 60 remaining therebetween.

When the building unit 41*b* and the building unit 41*c* are connected by the connection object 60, the building unit 41*b* and the building unit 41*c* are integrated with each other and the movements and the postures of these two objects are controlled as a whole based on the first action.

Further, as shown in FIG. 10, while the building unit 41*a* is connected to the right side of the building unit 41*c*, the movements and the postures of these three objects (41*a* to 41*c*) are controlled as a whole based on the first action. For example, in FIG. 10, in a case where the building unit 41*b* is selected, the building unit 41*b* floats in the air, and the building unit 41*c* connected to the building unit 41*b*, as well as the building unit 41*a* connected to the building unit 41*c*, also floats in the air. In other words, these building units 41*a* to 41*c* float in the air as a whole. For example, if the player character PC moves during this state, these building units 41*a* to 41*c* will move. In other words, when a plurality of operation target building objects are connected and integrated by the connection objects 60, the movements and the postures of these plurality of operation target building objects are controlled as a whole based on the first action.

The “movements” of the plurality of objects are “controlled and moved as a whole” means that the plurality of objects are moved without being separated, and means that they move while maintaining their positional relationship. The “posture” of the plurality of objects are “controlled as a whole” means that the plurality of objects are rotated while maintaining their positional relationship.

The connection of the plurality of operation target building objects is released in response to a predetermined release instruction. For example, the predetermined release instruction may be to move the analog stick 6 of the right controller 4 (or even the left controller 3) left, right, up or down while the operation target object is selected. For example, when the plurality of operation target building objects are integrated by connection objects 60, giving the release instruction while any one of the plurality of operation target building objects releases the connection between the selected operation target building object and the other operation target building objects connected thereto. In this case, the connection object 60 disappears.

Further, each of the building units 41 may not be connected to each other by the connection object 60. For example, if the building units 41 are spaced from each other, these building units 41 are not connected to each other by the connection object 60. For example, even if the first and second building units 41 are next to each other, the first building unit 41 and the second building unit 41 may not be connected to each other by the connection object 60, if these first and second building units 41 are not in a predetermined position or if the first and second building units 41 are not a connectable combination in the first place. In this case, the movement and the posture of each building unit 41 is individually controlled based on the first action.

In the construction mode, the player can control the movements and the postures of the building units 41 arranged in the virtual space, arrange a new building unit 41 in the virtual space and remove, from the virtual space, a building unit 41 arranged in the virtual space. For example, the player character PC has a storage area for storing building units 41 owned by the player character PC. By storing a building unit 41 that exist in the virtual space in the storage area, the building unit 41 can be removed from the virtual space. In the construction mode, the player character PC can arrange, in the virtual space, a building unit 41 stored in the storage area. Further, in the construction mode, for example, the player character PC can talk to a predetermined non-player character NPC to obtain a new building unit 41 and arrange the building unit 41 obtained in the virtual space.

Thus, the player can arrange the desired building unit 41 in the virtual space by newly arranging the building unit 41 in the virtual space or removing, from the virtual space, a building unit 41 arranged in the virtual space. Then, in the construction mode, the player controls the movement of the building units 41 (example operation target building objects) arranged in the virtual space based on the first action of the player character PC, thereby arranging the building units 41 in a desirable positional relationship. This allows the player to construct desired building objects 40.

Figure 11:
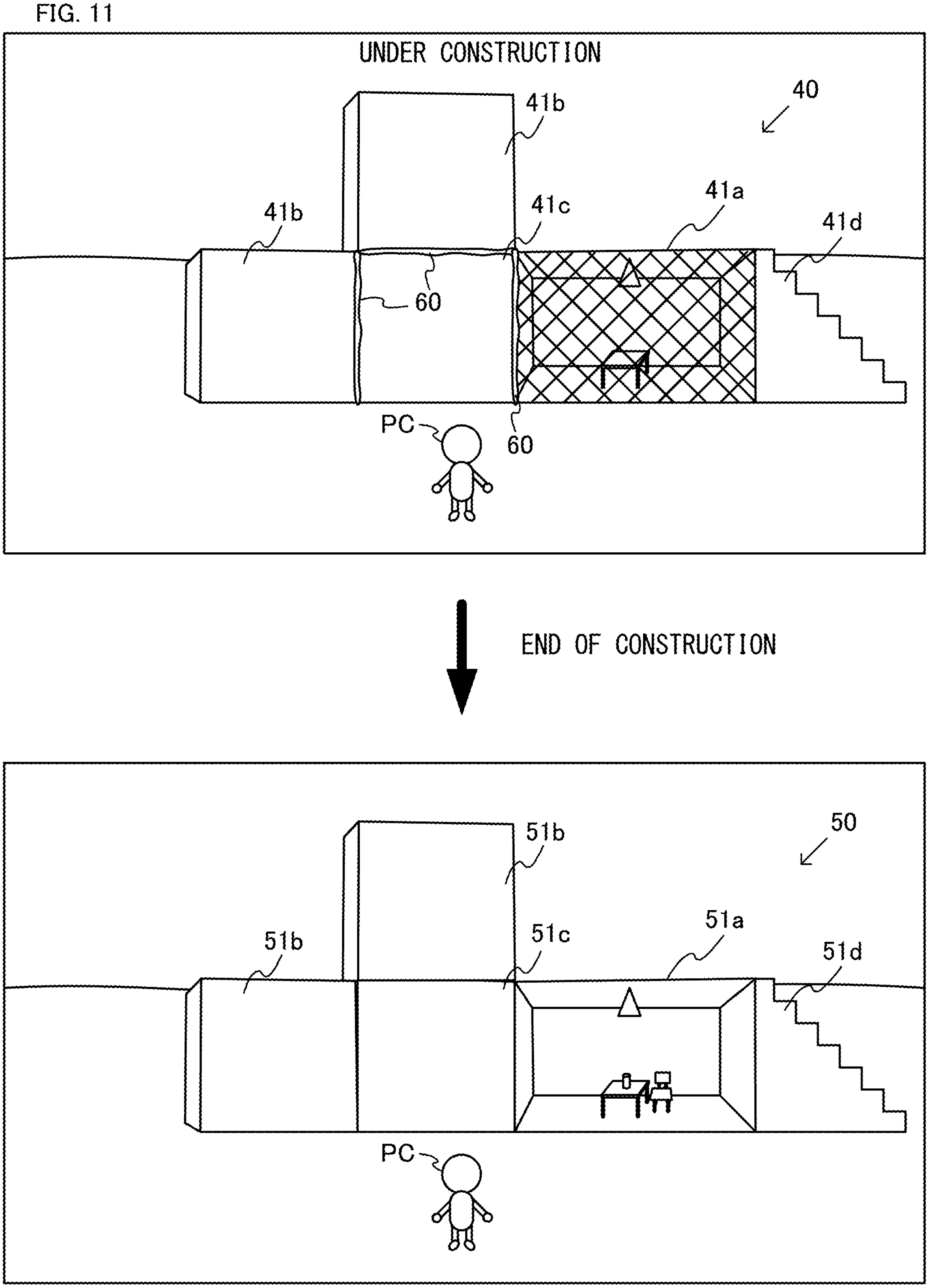
FIG. 11 is an example non-limiting diagram showing an example of how the game is shifted from the construction mode to the normal game mode after the construction of a building object is completed.

FIG. 11 is a diagram showing an example of how the game is shifted from the construction mode to the normal game mode after the construction of a building object is completed.

When the construction ends based on an operation input by the player, the game shifts from the construction mode to the normal game mode. For example, the player can move the player character PC to the position of the non-player character NPC and instructs an end the construction, to cause the game to shift from the construction mode to the normal game mode.

As shown in FIG. 11, at a time of shifting from the construction mode to the normal game mode, the building object 40 (the operation target building object), which is the target of the first action, is set to the building object 50 (the non-operation target building object), which is not the target of the first action. Specifically, when shifting from the normal game mode to the construction mode, the building unit 41*a* is replaced with the corresponding building unit 51*a*, and building unit 41*b* is replaced with the corresponding building unit 51*b*. Further, the building unit 41*c* is replaced by the corresponding building unit 51*c*, and the building unit 41*d* is replaced by the corresponding building unit 51*d*. In other words, the building units 41*a* to 41*d* arranged by the player during the construction mode are replaced by the corresponding building units 51*a* to 51*d* while maintaining the positional relationship of these objects.

Upon the shift to the normal game mode, the player character PC can enter the inside the room of the building objects 50.

Here, "an operation target building object is set to a non-operation target building object" at a time of shifting from the construction mode to the normal game mode encompasses a case where a three-dimensional first virtual model representing the non-operation target building object and a three-dimensional second virtual model representing the corresponding operation target building object are prepared as separate sets of data and the second virtual model is replaced by the first virtual model. Further, "an operation target building object is set to a non-operation target building object" encompasses a case where the first virtual model and the second virtual model are arranged in the virtual space and the state where only the second virtual model is active is switched to the state where only the first virtual model is active. Further, "an operation target building object is set to a non-operation target building object" encompasses a case where a single three-dimensional virtual model is prepared as the building object, the display mode and/or the collision determination for the virtual model is/are switched, and the first action for the virtual model is switched from the enabled state to the disabled state. Further, "an operation target building object is set to a non-operation target building object" encompasses a case where a single three-dimensional virtual model is prepared as a building object, and simply the first action for the virtual model is switched from the enabled state to the disabled state, without switching the display mode or the collision determination for the virtual model.

In the construction mode, the player character PC can still control the movement of the virtual objects 31 based on the first action, as described with reference to FIG. 4. The player character PC can connect the virtual objects 31 to each other with the connection objects 60 during the construction mode. However, the virtual object 31 cannot be connected to the building unit 41 with the connection object 60 based on the first action. In other words, while the building units 41 can be connected to each other with the connection objects 60 and the virtual objects 31 can be connected to each other with the connection object 60, the virtual objects 31 and the building units 41 cannot be connected to each other with the connection object 60, during the construction mode.

In this exemplary embodiment, while the virtual object 31 is on the building object 40 or in a predetermined area where the building object 40 is arranged, shifting from the construction mode to the normal game mode cannot take place. In such a case, a predetermined warning is displayed. In other exemplary embodiments, shifting from the construction mode to the normal game mode may be possible even when the virtual object 31 is arranged on the building object 40 or in a predetermined area where the building object 40 is arranged.

(Building Units)

The following describes example building units 41. FIG. 12 is a diagram showing a plurality of exemplary types of building units in the game of this exemplary embodiment.

As shown in FIG. 12, in the game of this exemplary embodiment, for example, building units A to F are prepared in advance as the building units. Each unit has its characteristic, and the size and shape thereof are determined in advance. For example, the building unit A is 2 in width, 1 in height, and 2 in depth. Further, the building unit A is also a room unit and is a room with a square floor surface. The room of the building unit A includes a table and a chair. The building unit B is a room unit that is 2 in width, 1 in height, 1 in depth, and has a rectangular floor surface. The room of the building unit B has a bed arranged in advance, and the player character PC can sleep on the bed. The building unit C is a room unit that is 2 in width, 1 in height, 1 in depth, and has a rectangular floor surface. The room of the building unit C has a stand for displaying a weapon in advance, and the player character PC can display a weapon owned by the player character PC. Further, the building unit D is a stair unit.

Figure 13:
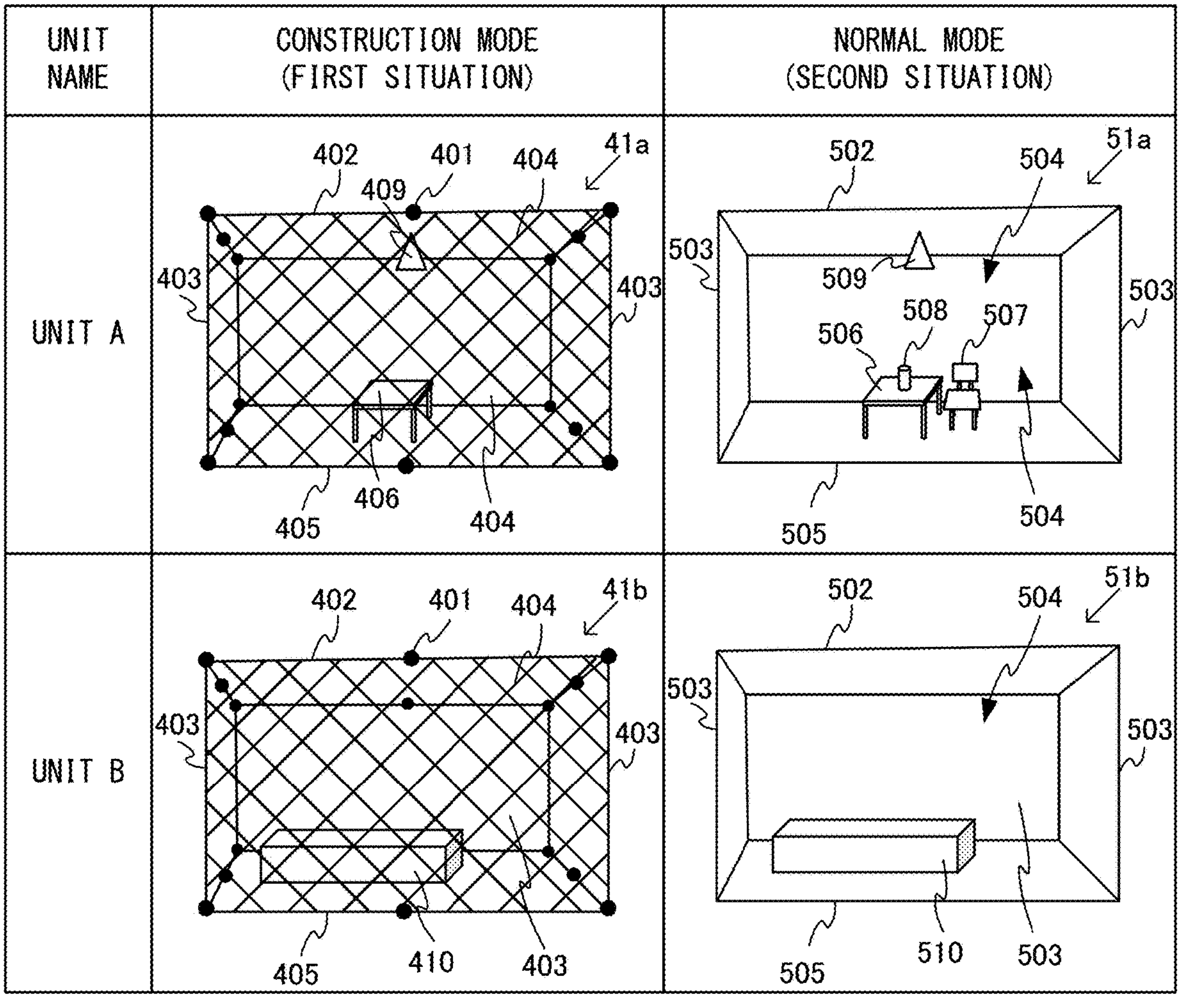
FIG. 13 is an example non-limiting diagram showing an exemplary virtual model showing each of the building unit.

These plurality of building units A to F are predefined as three-dimensional virtual models. With reference to FIG. 13, the following details some of the plurality of building units A to F. FIG. 13 is a diagram showing an exemplary virtual model showing each building unit.

As shown in FIG. 13, a building unit 41*a* used in the construction mode and a building unit 51*a* used in the normal game mode are prepared in advance as virtual models representing the building unit A.

The building unit 41*a* has a plurality of connection points 401, a ceiling surface 402, left and right wall surfaces 403 facing each other, front and rear mesh objects 404 facing each other, and a floor surface 405. The connection points 401 are each a point for connecting each building unit 41 and will be detailed later. The ceiling surface 402, the wall surfaces 403, the mesh objects 404, and the floor surface 405 are surfaces for which the collision determination (hit determination) is enabled, and the player character PC (and any other objects) is not able to enter inside the room of the building unit 41*a*. The collision determination (hit determination) is also enabled for the interior of the room of the building unit 41*a*. Therefore, even if a second action described later is performed by the player character PC, the player character PC is not able to enter inside the room of the building unit 41*a*. A table 406 fixed to the floor surface 405 and an illumination 409 fixed to the ceiling surface 402 are arranged inside the room of the building unit 41*a*, as furniture objects.

The building unit 51*a* has a ceiling surface 502, left and right wall surfaces 503 facing each other, and a floor surface 505. The ceiling surface 502, the wall surfaces 503, and the floor surface 505 are surfaces for which the collision determination (hit determination) is enabled. The building unit 51*a*, on the other hand, has openings 504 at front and rear positions facing each other. The player character PC (and any other objects) is able to enter inside the room of the building unit 51*a* through the openings 504. A table 506, a chair 507, tableware 508 (dishes, cups, etc.), and an illumination 509 are arranged inside the room of the building unit 51*a*, as furniture objects. For example, the table 506 is fixed to the floor surface 505 and the illumination 509 is fixed to the ceiling surface 502. In the normal game mode, the interior of the room of the building unit 51*a* is hollow except for the parts of the furniture objects and the collision determination is not performed. Thus, the player character PC is able to enter inside the room of the building unit 51*a* and move around inside the room.

The building unit 41*a* and the building unit 51*a* have the same size and are identical in exterior appearance, but differ in the following points. That is, the two front and rear sides of the building unit 41*a* are blocked by the mesh objects 404, while the two front and rear sides of the building unit 51*a* are open. Thus, while the interior of the room of the building unit 41*a* is visible from the outside, it is less visible than inside the building unit 51*a*. In addition, the player character PC is not able to enter inside the room of the building unit 41*a*, while the player character PC is able to enter inside the room of the building unit 51*a*. First furniture objects (table and illumination) that are identical to those in the room of the building unit 51*a* are arranged inside the room of the building unit 41*a*. On the other hand, while the room of the building unit 51*a* include second furniture objects (chair and tableware), the room of the building unit 41*a* does not include the second furniture objects. Note that the building unit 41*a* and the building unit 51*a* may have exactly the same furniture objects.

As shown in FIG. 13, the building unit 41*b* used in the construction mode and the building unit 51*b* used in the normal game mode are prepared in advance as virtual models representing the building unit B.

The building unit 41*b* has a plurality of connection points 401, a ceiling surface 402, three wall surfaces 403, a mesh object 404, and a floor surface 405. The ceiling surface 402, the wall surfaces 403, the mesh object 404, and the floor surface 405 are surfaces for which the collision determination is enabled, and the player character PC is not able to enter inside the room of the building unit 41*b*. The collision determination is also enabled for the interior of the room of the building unit 41*b*. Further, a bed 410 fixed to the floor surface 405 is arranged inside the room of the building unit 41*b*, as a furniture object.

The building unit 51*b* has a ceiling surface 502, three wall surfaces 503, and a floor surface 505. The ceiling surface 502, the wall surfaces 503, and the floor surface 505 are surfaces for which the collision determination (hit determination) is enabled. The building unit 51*b* also has an opening 504. The player character PC is able to enter inside the room of the building unit 51*b* through the opening 504. Further, a bed 510 is arranged inside the room of the building unit 51*b* as a furniture object. For example, the bed 510 is fixed to the floor surface 505. In the normal game mode, the interior of the room of the building unit 51*b* is hollow except for the parts of the furniture objects and the collision determination is not performed. Thus, the player character PC is able to enter inside the room of the building unit 51*b* and move around inside the room.

(Control According to Posture of Building after Construction is Finished)

In this exemplary embodiment, if the posture of the building unit 41 arranged during the construction mode meets a predetermined condition, at least some of the objects inside the building unit 51 or an action inside the building unit 51 are disabled at the time of shifting from the construction mode to the normal game mode.

Figure 14:
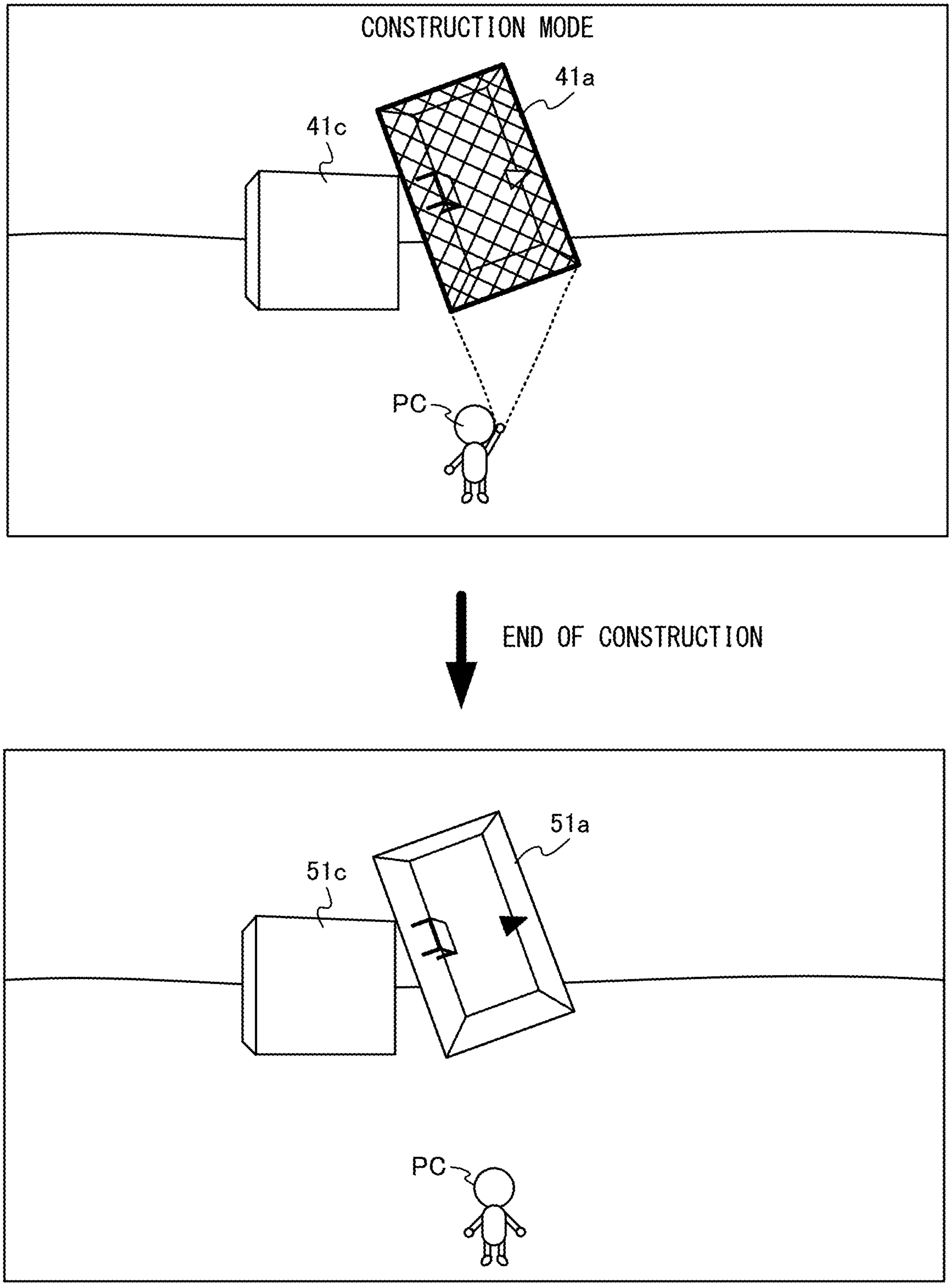
FIG. 14 is an example non-limiting diagram showing an exemplary game image when the game is shifted from the construction mode to the normal game mode after the construction in the construction mode in the construction mode is finished, with the building unit 41*a* inclined.

FIG. 14 is a diagram showing an exemplary game image when the game is shifted from the construction mode to the normal game mode after the construction is finished with the building unit 41*a* inclined in the construction mode.

Each building unit 41 in the virtual space is given a mass, and a physical calculation is performed based on the virtual gravity, the mass of each building unit 41, a collision determination with other objects, and the like to determine the posture of the building unit 41. As shown in FIG. 14, in the construction mode, for example, the building unit 41*a* is moved and posture-controlled based on the first action and is held stationary leaning against the building unit 41*c*. For example, the building unit 41*a* is stationary with its floor surface 405 inclined at a predetermined angle to the ground. When an instruction to terminate the construction is given during this state, the inclined building unit 41*a* is replaced by the inclined building unit 51*a*. The player character PC can still enter inside the room of the inclined building unit 51*a* during this state. When the building unit 41*a* is replaced by building unit 51*a*, at least any of the furniture objects arranged inside the rooms of building unit 51*a* are disabled, as shown in the lower diagram in FIG. 14. For example, the chair 507 and the tableware 508 arranged inside the room of the building unit 51*a* are disabled with the building unit 51*a* is inclined. The illumination 509 is also disabled with the building unit 51*a* being inclined.

In this exemplary embodiment, the display can be enabled/disabled for the chair 507 and the tableware 508 included in the building unit 51*a*. Specifically, if the inclination of the floor surface 506 of the building unit 51*a* is not more than a threshold, the display of chair 507 and the tableware 508 is enabled and the chair 507 and the tableware 508 are displayed (building unit 51*a* in FIG. 11). On the other hand, if the inclination of the floor surface 506 of the building unit 51*a* exceeds the threshold value, the display of chair 507 and the tableware 508 is disabled and the chair 507 and the tableware 508 are not displayed. The collision determination for the chair 507 and the tableware 508 is also disabled. If the inclination of the floor surface 506 of the building unit 51*a* is not more than the threshold value, the illumination 509 is enabled and the illumination 509 turns on. On the other hand, if the inclination of the floor surface 506 of the building unit 51*a* exceeds the threshold, the illumination 509 is disabled, and the illumination 509 itself is displayed, but the illumination 509 is not turned on and the interior of the room of the building unit 51*a* becomes dark.

Further, in this exemplary embodiment, if the inclination of the building unit 51*a* exceeds the threshold value, the display of the furniture objects in the building unit 51*a* is disabled so that the furniture objects are not displayed. In another exemplary embodiment, if the inclination of the building unit 51*a* exceeds a threshold value, the furniture objects in the building unit 51*a* may be disabled by erasing the furniture objects (erasing the 3D model of the furniture objects). In another exemplary embodiment, the first building unit 51*a* including the furniture objects and the second building unit 51*a* without the furniture objects are prepared as separate virtual models, and the first building unit 51*a* or the second building unit 51*a* may be arranged in the virtual space, depending on the inclination of the building unit 51*a*. In this way, the furniture objects may be disabled if the inclination of the building unit 51*a* is beyond a threshold value.

Figure 15:
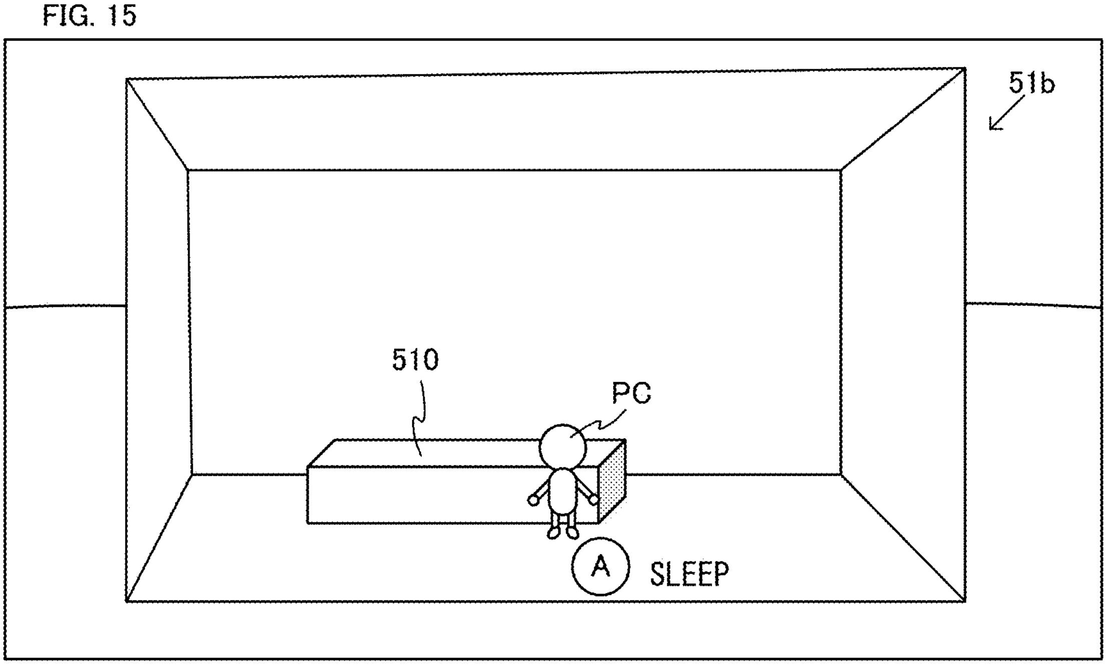
FIG. 15 is an example non-limiting diagram showing an exemplary game image when a building unit 51*b* is not inclined.
Figure 16:
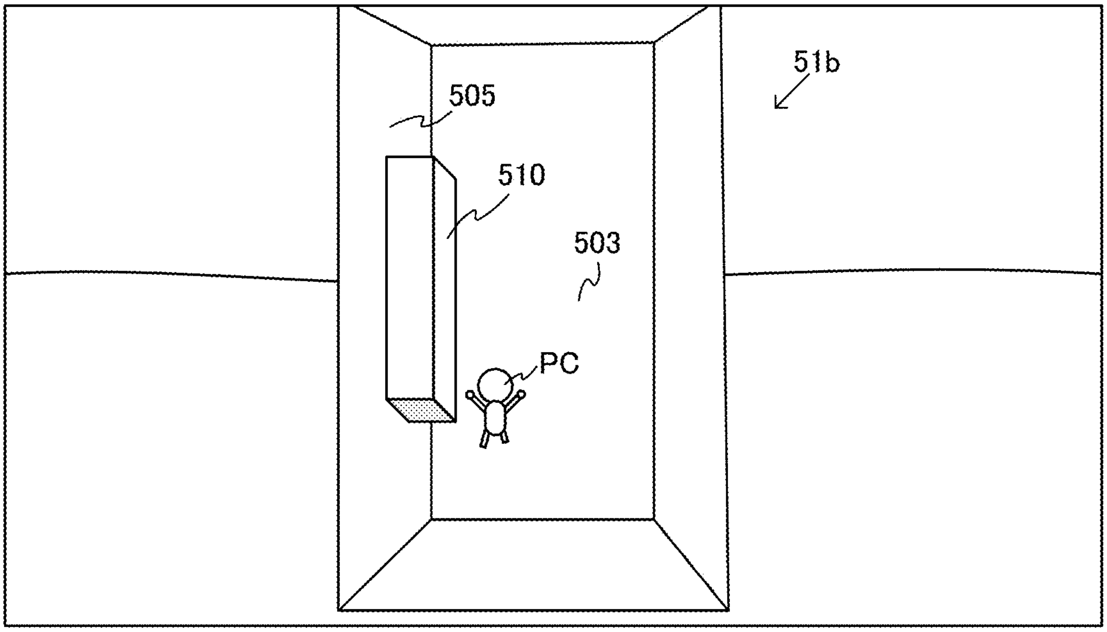
FIG. 16 is an example non-limiting diagram showing an exemplary game image when the building unit 51*b* is inclined.

FIG. 15 is a diagram showing an exemplary game image when the building unit 51*b* is not inclined. FIG. 16 is a diagram showing an exemplary game image when the building unit 51*b* is inclined.

For the building unit 51*b* too, the furniture objects are also enabled/disabled depending on the posture of the building unit 51*b*. As shown in FIG. 15, a bed 510 is arranged inside the room of the building unit 51*b* as the furniture object. When the player character PC enters inside the room of the non-inclined building unit 51*b* and approaches to the vicinity of the bed 510, the display prompts pressing of a predetermined button on the controller (e.g., the A-button). When the predetermined button is pressed, the player character PC performs an action of sleeping on the bed 510.

Meanwhile, as shown in FIG. 16, even if the inclination of the floor surface 505 of building unit 51*b* exceeds the threshold value, the bed 510 is still arranged inside the room of the building unit 51*b*. Even if the inclination of the floor surface 505 of the building unit 51*b* exceeds the threshold, the player character PC can still enter inside the room of the building unit 51*b*. For example, even if the floor surface 505 of the building unit 51*b* is almost vertical, the player character PC can climb up the wall surface 503 or the floor surface 505 and approach the vicinity of the bed 510. When the player character PC approaches the vicinity of the bed 510, the display does not prompt the pressing of the predetermined button, and even if the predetermined button is pressed, the player character PC does not perform the sleeping action on the bed 510. That is, if the inclination of the building unit 51*b* exceeds the threshold value, the sleeping action on the bed 510 performed by the player character PC is disabled. The bed 510 may not be displayed inside the room of the building unit 51*b*, if the inclination of the floor surface 505 of the building unit 51*b* exceeds the threshold value.

Further, although illustration in drawings is omitted, in other building units 51 too, objects placed inside the building units 51 may be disabled or the actions of the player character PC inside the building units 51 may be disabled, depending on the posture of the building unit 51.

For example, a stand that displays items is placed inside of the room of the building unit C. As a virtual model representing the building unit C, a building unit 41*a* used in the construction mode and a building unit 51*a* used in the normal game mode are prepared in advance. If the inclination of the building unit 51*c* is not more than the threshold value, the player character PC can perform actions such as decorating a weapon object owned by the player character PC or taking a weapon object displayed on the stand. On the other hand, if the inclination of the building unit 51*c* exceeds the threshold, the player character PC is not able to perform the action of decorating the weapon object. Even if the inclination of the building unit 51*c* exceeds the threshold, the player character PC may still be able to perform the action of taking the weapon object displayed on the stand.

Further, the building unit F is a pond unit, and as a virtual model representing building unit F, a building unit 41*f* used in the construction mode and a building unit 51*f* used in the normal game mode are prepared in advance. When the building unit 51*f* is not inclined, the inside of the building unit 51*f* is filled with water and fish objects swim in the water. On the other hand, when the building unit 51*f* is inclined, the water object and the fish object are both disabled.

Thus, at least any of the plurality of building units has an internal object (furniture object, water object, and the like) arranged in its internal space, and if the posture of the building unit 51 meets a predetermined condition, the internal object of a predetermined type is disabled. The predetermined condition related to the posture of the building unit 51 may vary depending on the type of building unit 51. For example, the internal object is displayed when the floor surface of the building unit 51 is horizontal, whereas the internal object is not displayed when the floor surface of building unit 51 is inclined. Displaying the internal object while the building unit 51 is inclined may cause a sense of wrongness to the player. However, in this exemplary embodiment, the internal object can be disabled while the building unit 51 is inclined, so that it does not cause a sense of wrongness.

(Connection by Connection Point)

Figure 17:
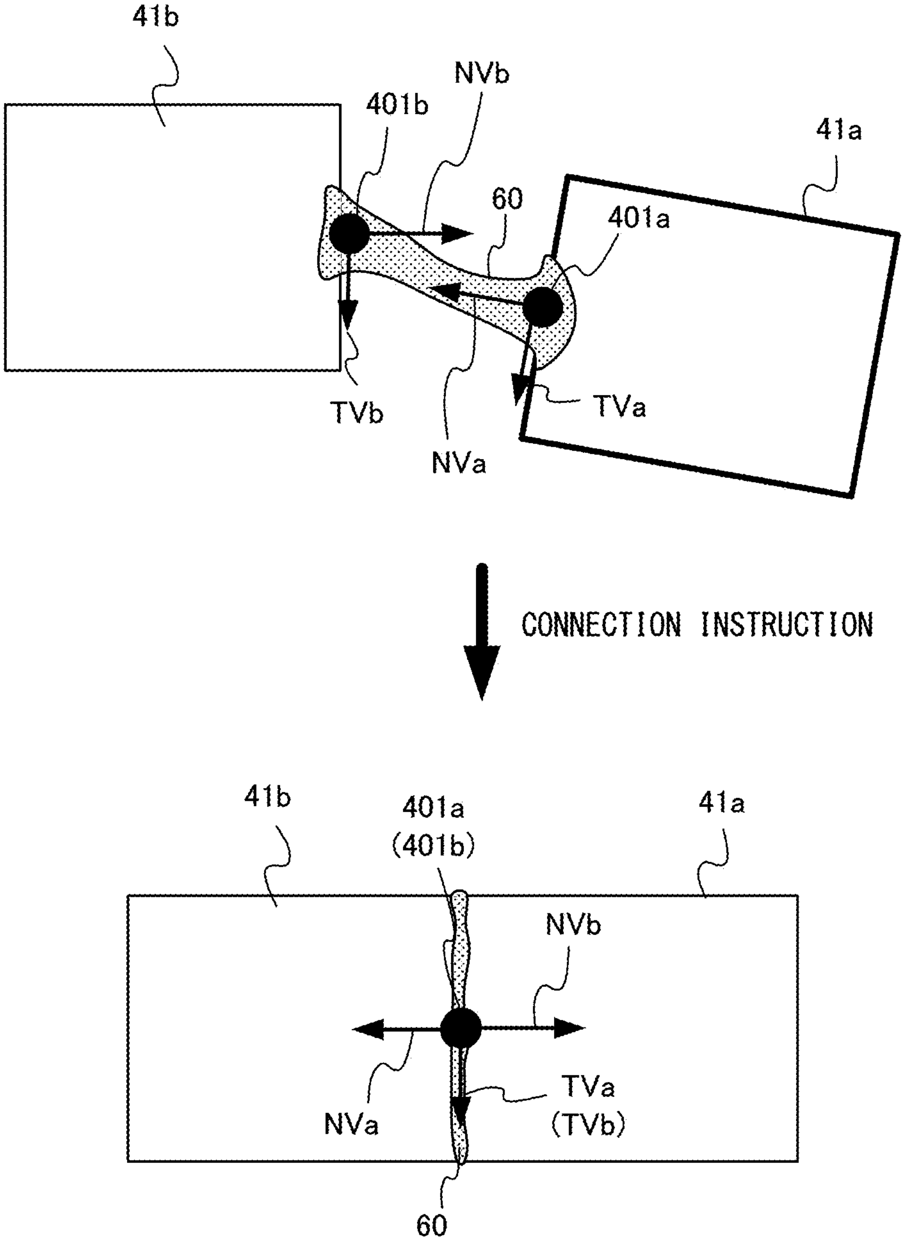
FIG. 17 is an example non-limiting diagram showing how the building unit 41*a* and the building unit 41*b* are connected to each other by a connection point 401 during the construction mode.

The following describes connection using a connection point 401 of each building unit 41. FIG. 17 is a diagram showing how the building unit 41*a* and building unit 41*b* are connected to each other by a connection point 401 during the construction mode.

FIG. 17 shows a situation where the first action is performed on the building unit 41*a* and a connection instruction is given while the building unit 41*a* and building unit 41*b* meet a predetermined connection condition. As shown in FIG. 17, the building unit 41*a* has a connection point 401*a* and the building unit 41*b* has a connection point 401*b*. The connection point 401*a* has a normal vector NVa perpendicular to the plane on which the connection point 401*a* is set and a tangent vector TVa that is the tangential direction of the plane. Further, the connection point 401*b* has a normal vector NVb perpendicular to the plane on which the connection point 401*b* is set and a tangent vector Tvb that is the tangential direction of the plane.

As shown in the upper diagram of FIG. 17, before the building unit 41*a* and the building unit 41*b* are connected, the building unit 41*a* and the building unit 41*b* meet the predetermined connection condition and are ready to be connected. For example, the predetermined connection condition may be the distance between the building unit 41*a* and the building unit 41*b* being less than a predetermined value. The predetermined connection condition may be the normal vector NVa and the normal vector NVb meet a predetermined condition. For example, the connection point 401*a* and the connection point 401*b* are determined as to meet the predetermined connection condition, if the distance between the connection point 401*a* and the connection point 401*b* is less than a predetermined value and the normal vector NVa and the normal vector NVb meet the predetermined conditions. In this case, the connection object 60 is arranged between the building unit 41*a* and building unit 41*b*. Specifically, if the connection point 401*a* and connection point 401*b* meet the predetermined connection condition, the connection object 60 that connects the connection point 401*a* and the connection point 401*b* is displayed.

When the connection instruction is given by the player during this state, the connection point 401*a* and the connection point 401*b* are connected by the connection object 60 and the building unit 41*a* and the building unit 41*b* are integrated, as shown in the lower diagram in FIG. 17. When the connection point 401*a* and connection point 401*b* are connected by the connection object 60, the position and the posture of the building unit 41*a* and the building unit 41*b* are adjusted. Specifically, the positions of the building unit 41*a* and the building unit 41*b* are adjusted so that connection point 401*a* and the connection point 401*b* overlap. The posture of the building unit 41*a* and the building unit 41*b* are adjusted so that the angle between the normal vector NVa and the normal vector NVb is a predetermined value (e.g., an angle out of 180 degrees, 135 degrees, 90 degrees, and 45 degrees that is closest to the current posture). The posture of the building unit 41*a* and the building unit 41*b* are adjusted so that the angle between the tangent vector TVa and the tangent vector TVb is a predetermined value (e.g., an angle out of 180 degrees, 135 degrees, 90 degrees, and 45 degrees that is closest to the current posture).

Thus, by connecting the building units 41 to each other by the connection points, the player can easily construct the building objects.

(Second Action)

Next, the second action of the player character PC will be described. As a second action, the player character PC can perform an action to move through an object that serves as a ceiling above the player character PC to a destination above it (hereinafter referred to as "passing through movement").

Figure 18:
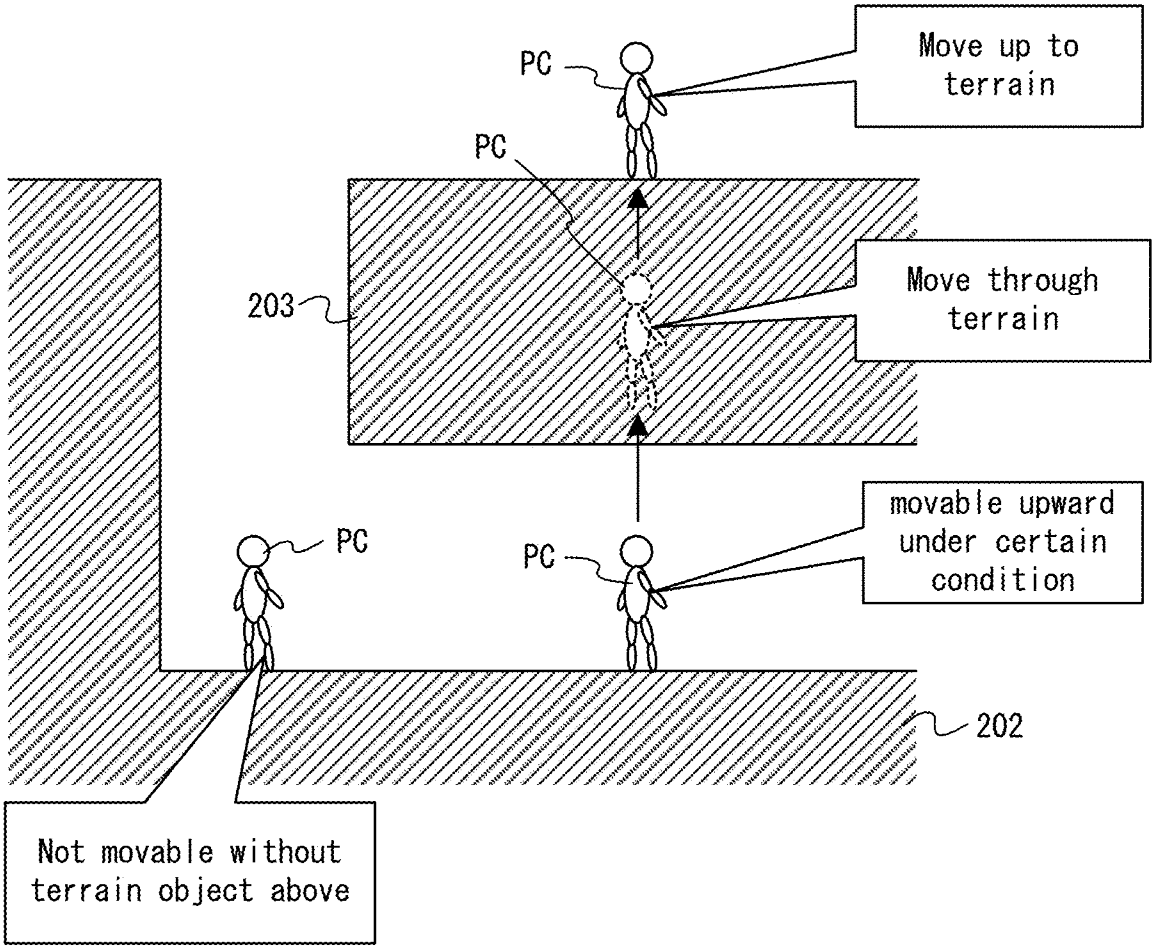
FIG. 18 is an example non-limiting diagram showing the player character PC performing a passing through movement in the normal game mode.

FIG. 18 is a diagram showing how the player character PC performing the passing through movement in the normal game mode. FIG. 18 is a view of the game space as seen in a direction parallel to the horizontal direction. In the state of FIG. 18, the player character PC is arranged on the terrain object 202 and a terrain object 203 that serves as a ceiling thereabove. When the predetermined movement condition is met during the state, the second action (passing through movement) is performed in response to the operation input by the player. This allows the player character PC to move through the terrain object 203 and move above the terrain object 203 (see FIG. 18).

The predetermined movement condition may be a condition regarding whether or not there is a destination above the player character PC, further above the ceiling, where the player character PC can be arranged. The "destination where the player character PC can be arranged" is a location where the player character PC does not collide with another object. In other words, the location where the player character PC is determined to collide with another object is not the "destination where the player character PC can be arranged". The "destination where the player character PC can be arranged" may be a location where the player character PC does not collide with another object and where the inclination is smaller than the threshold value.

Further, in this specification, a terrain object refers to any object arranged in the virtual space, and refers to any object that allows arrangement of the player character PC on at least a part of the terrain object. The building object 40 and the building object 50 described above are a type of terrain object. The terrain object may represent the ground in the virtual space, or it may be an object arranged on the ground (e.g., a rock).

In this specification, a ceiling is not limited to the ceiling part of a building object, but may also be a part of any terrain object facing down, and the part that allows the passing through movement can be a ceiling. For example, when a terrain object representing a ground has a cave, or when a terrain object representing a mountain has a tunnel, the part of the terrain object that faces downward is a ceiling.

As shown in FIG. 18, when the player character PC performs the passing through movement, it does not mean a hole is formed in the terrain object. The passing through movement of this exemplary embodiment is such that the collision determination (hit determination) between the player character PC and the terrain object is exceptionally not performed (disabled) during such a movement, thereby moving the player character PC, ignoring the collision determination with the terrain object.

The passing through movement above is different from a movement of the player character PC jumping from the ground. In this exemplary embodiment, the passing through movement is performed on condition that there is at least a ceiling above the player character PC, and if there is no ceiling above the player character PC, the player character PC does not perform the passing through movement (see FIG. 18, in this case, the jumping movement is also not performed). Therefore, the passing through movement is different from a general jumping movement of the player character PC jumping in response to an operation by the player. In this exemplary embodiment, the player character PC can perform a jumping movement by an operation different from the passing through movement.

Figure 19:
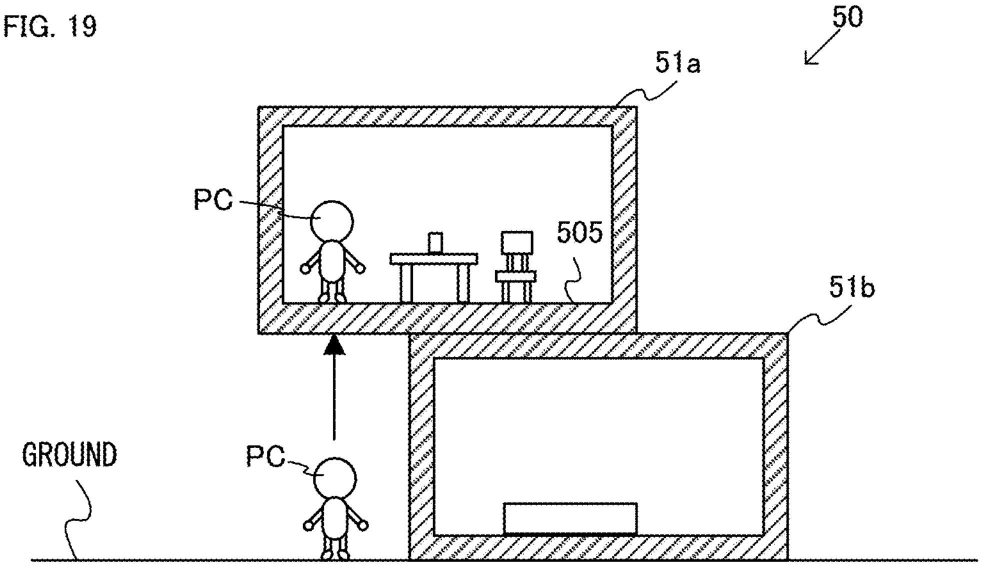
FIG. 19 is an example non-limiting diagram showing the player character PC passing through the building unit 51*a* in the normal game mode.

The passing through movement described is also performable with respect to the building object 50 constructed in the construction mode. FIG. 19 is a diagram showing how the player character PC performs passing through movement with respect to the building unit 51*a* during the normal game mode.

As shown in FIG. 19, when the building unit 51*a* is arranged on top of the building unit 51*b* and when the player character PC is positioned below the building unit 51*a*, the building unit 51*a* serves as a ceiling above the player character PC. In this case, the player character PC can perform the passing through movement described above. The interior of the room of the building unit 51*a* is set as "destination where the player character PC can be arranged", as it is a place where the player character PC does not collide with another object. Therefore, when the player character PC performs a passing through movement, the player character PC moves through the floor surface 505 of the building unit 51*a* to the interior of the room of the building unit 51*a*. This allows the player character PC to enter inside the room of the building unit 51*a* by a special action, in addition to a normal entry route (through an opening). Even if the building unit 51 is covered by walls and there is no entry route into the interior of the room of the building unit 51, the player character PC can enter inside the room of the building unit 51 by performing the passing through movement.

Figure 20:
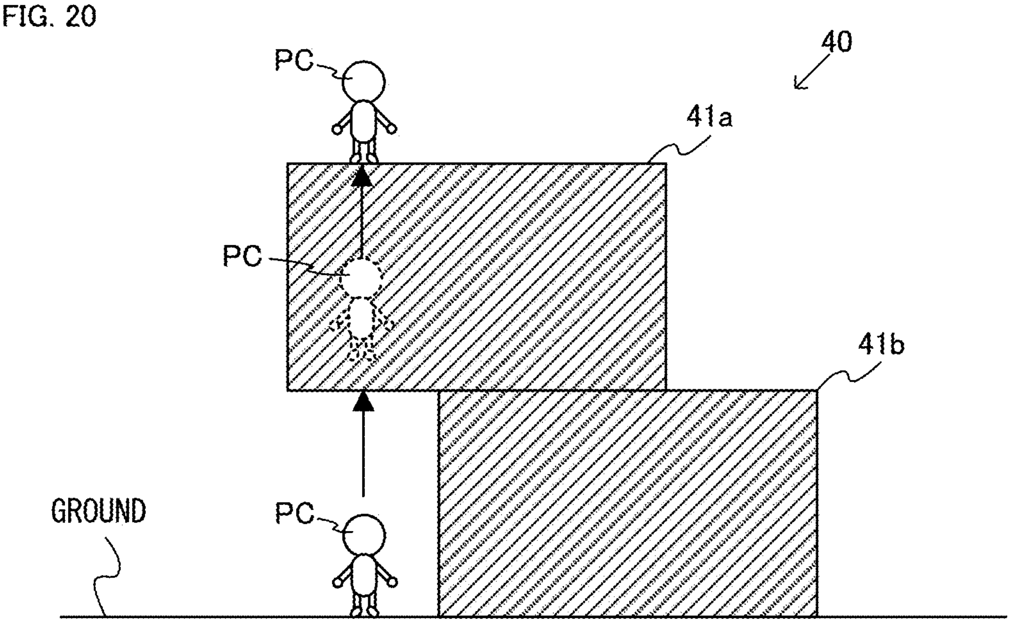
FIG. 20 is an example non-limiting diagram showing the player character PC moving through the building unit 41*a* in the construction mode.

FIG. 20 is a diagram showing how the player character PC moves through the building unit 41*a* during the construction mode. As described above, during the construction mode, the collision determination is enabled for the interior of the room of each of the building units 51. In other words, in the construction mode, the interior of the room of each building unit 41 is treated as filled with objects and is where the player character PC collides with another object. Thus, the interior of the room of each building unit 41 is not "destination where the player character PC can be arranged". Therefore, in the construction mode, the player character PC is not able to enter inside the room of the building unit 41*a* when performing the passing through movement, but moves to the outside of building unit 41*a*, through the interior of the room of the building unit 41*a*.

As described above, this exemplary embodiment allows control movements of a plurality of operation target objects (e.g., virtual objects 31) that are targets of the first action based on the first action, thereby allowing assembling of the plurality of operation target objects to generate an assembled object, during the normal game mode or the construction mode. By controlling the movements of the operation target building objects (e.g., building units 41) that are arranged in the virtual space and are targets of the first action based on the first action during the construction mode, a building object constituted by a plurality of operation target building objects can be generated.

This way, the first action that can control the movements of the operation target objects is able to control the movements of the operation target building objects (e.g., building units 41). Thus, the player can generate and change desired building objects in the virtual space even without a dedicated function for generating and changing the building objects. Further, the player can generate and change the building objects and easily generate and change the building objects by using the same operation input as that for the operation target objects. Therefore, the usability can be improved.

Further, at the time of shifting from the construction mode to the normal game mode, an operation target building object (building unit 41) targeted for the first action is set to a non-operation target building object (building unit 51), which is not the target of the first action. At the time of shifting from the normal game mode to the construction mode, a non-operation target building object (building unit 51) arranged in the virtual space is set to an operation target building object (building unit 41). This allows the building object to be excluded from the target for the first action after the building object is created or changed, and fix the building object in the virtual space.

Further, based on the first action, a plurality of operation target building objects are connected to each other, and the plurality of operation target building objects having been connected are integrated and subjected to movement control as a whole. This allows the player to easily operate a building object constituted by a plurality of operation target building objects.

The plurality of operation target building objects each has at least one connection point where a connection direction (normal direction and/or tangential direction) is set. When the operation target building objects are connected to each other, the position and the posture of the operation target building objects are adjusted so that the connection points are connected to each other based on their connection directions. This allows the operation target building objects to be easily connected to each other, even if the shape of each operation target building object is complex.

Any of the multiple types of the building objects is a room object, and the player character PC is able to enter inside the room during the normal game mode and is not able to enter inside the room during the construction mode. That is, the room object as the non-operation target building object has a shape that is subjectable to the collision determination and that allows the player character PC to enter inside the non-operation target building object. Further, the room object as the operation target building object has a shape that is subjectable to the collision determination and that does not allow the player character PC to enter inside the operation target building object.

This way, the player character PC is restricted from entering inside the room while the building object is under construction. For example, unnecessary objects can be restricted from being arranged during the construction of the building object.

Further, the operation target building object (e.g., building unit 41*a*) has an object (e.g., mesh object) that blocks an opening of the room at the position corresponding to the opening. The object blocking the opening is configured so that the interior of the room is at least partially visible. This restricts the player character PC from entering inside the room of the operation target building object and yet making the interior of the operation target building object visible to the player.

In this exemplary embodiment, the player character PC can also perform a second action. If there is an object serving as a ceiling above the player character PC and if there is a destination above the ceiling object, where the player character PC can be arranged, the player character PC moves through the object to the destination by the second action. The player character cannot be arranged inside the operation target building object, and the player character can be arranged inside the non-operation target building object. The player character PC is able to enter inside the room of the non-operation target building object by performing the second action.

The non-operation target building object (e.g., building unit 51*a*) also has interior objects (e.g., furniture objects) arranged in its interior space. If the posture of the non-operation target building object meets the predetermined condition (e.g., if the inclination of the floor surface exceeds a threshold value), the interior objects are disabled. This allows, for example, the interior object is not displayed while the non-operation target building object is inclined, so that it does not cause a sense of wrongness.

Further, in this exemplary embodiment, the operation target objects can be connected to each other and the operation target objects having been connected can be integrated and subjected to movement control by the first action. Specifically, the first action can connect a plurality of operation target objects to each other, except for a combination of an operation target building object (e.g., building unit 41) and an operation target object other than the operation target building object (e.g., virtual object 31). Since the operation target building object is not connected to any operation target object other than the operation target building object, the movement control of the operation target building object by the first action is not distracted, and a building object can be easily constructed.

In this exemplary embodiment, when a plurality of operation target building objects are connected, a connection object is arranged at the connecting position of the plurality of operation target building objects. When the plurality of operation target building objects are set to non-operation target building objects, no connection object is arranged at the connecting position. This enables display to have the player clearly understand that the operation target building objects are connected to each other and their connecting position by arranging the connection object to the building object under construction. Once the construction of a building object is complete, the connection object is not arranged, which allows an improved appearance of the building object. Further, displaying of such a connection object also allows the player to easily recognize that the connected operation target objects can be operated by the first action.

(Game Processing Details)

Figure 21:
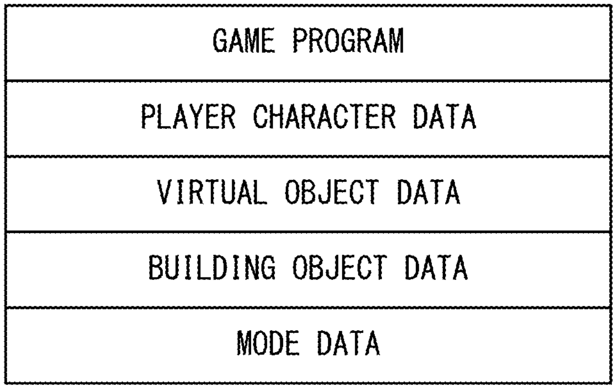
FIG. 21 is an example non-limiting diagram showing an exemplary data stored in a memory of the main body apparatus 2 while game processing is executed.

Next, the game processing related to the games described above will be detailed. First, the data used for the game processing will be described. FIG. 21 is a diagram showing exemplary data stored in a memory of the main body apparatus 2 while game processing is executed.

As shown in FIG. 21, the memory (DRAM 27, flash memory 26, or external storage medium) of the main body apparatus 2 stores the game program, player character data, virtual object data, building object data, and mode data. Note that various other data used for game processing are stored in the memory, in addition to these data.

The game program is a program for executing the game processing described later. The game program is stored in advance in the external storage medium mounted in the slot 29 or the flash memory 26, and is read into the DRAM 27 at a time of executing the game. The game program may be obtained from another device via a network (e.g., the Internet).

The player character data is data related to the player character PC and includes information related to the position, posture, and shape of the player character PC in the virtual space. The player character data also includes information indicating whether the player character PC is performing the first action or not. The player character data also includes information indicating whether the player character PC is performing the second action or not. The player character data also includes information on the type and number of building units owned by the player character PC. Further, the player character data includes information indicating items (weapons, armor, food, etc.) and abilities owned by the player character PC.

Virtual object data is data about virtual objects 31 (31*a* to 31*c*, and the like) arranged in the virtual space. Virtual object data includes data representing the position and posture of each virtual object 31 in the virtual space. The virtual object data also includes information about the connection between each of the virtual objects 31 (e.g., information about the presence or absence, position, and the like, of connection object 60).

Building object data is data about building objects (40 and 50) arranged in the virtual space. Specifically, the building object data includes data about the position and posture of each of the building units 41. The building object data also includes data about the position and posture of each of the building units 51. The building object data also includes data about the enable/disable of the internal objects contained in each of the building units 51.

The mode data indicates whether the game is in the normal game mode or the construction mode.

Figure 22:
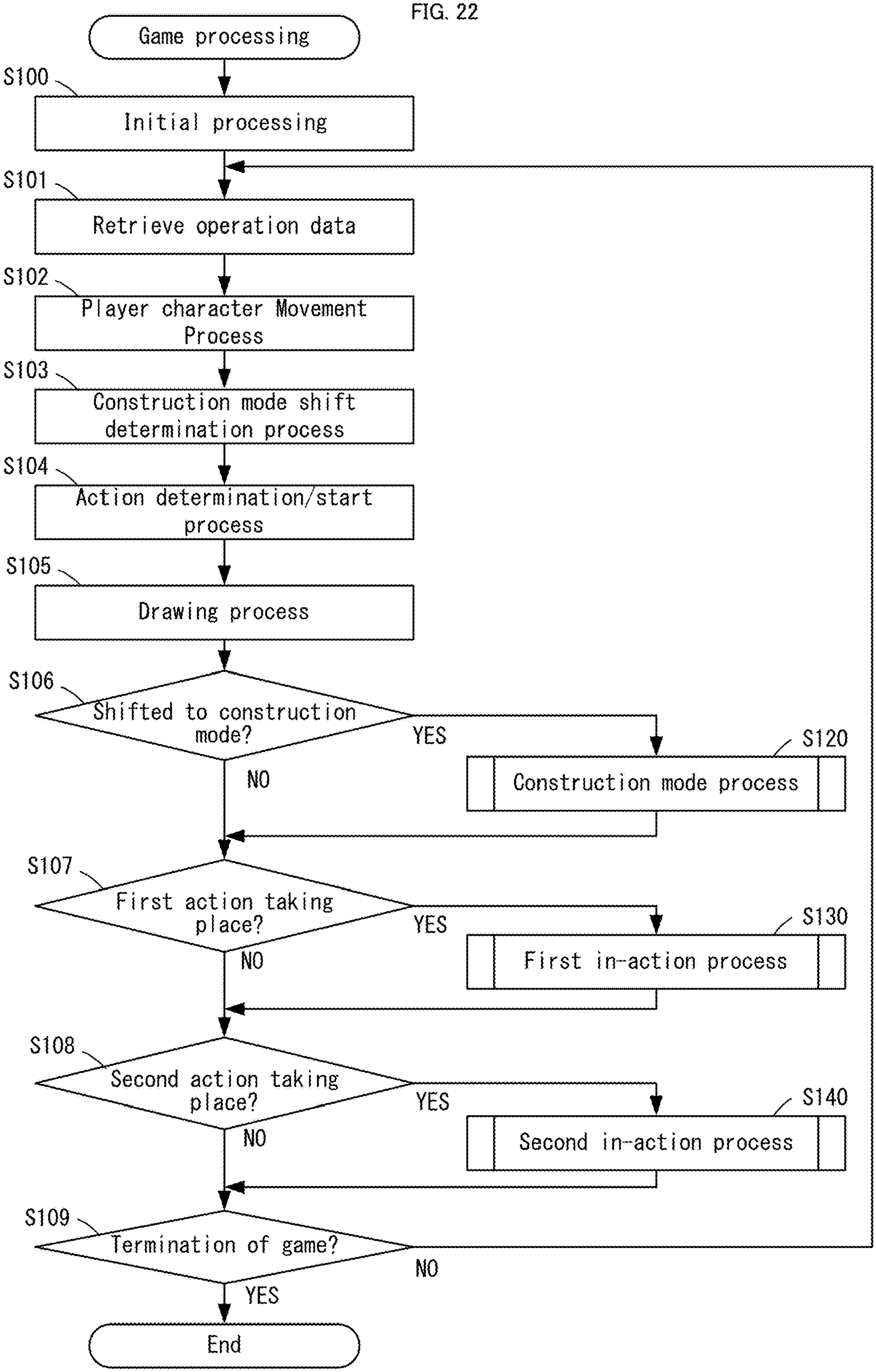
FIG. 22 is an example non-limiting flowchart showing an exemplary game processing executed by a processor 21.

Next, the following details the game processing performed in the main body apparatus 2. FIG. 22 is a flowchart showing exemplary game processing executed by the processor 21.

As shown in FIG. 22, when the game processing is started, the processor 21 executes initial processing (step S100). Specifically, the processor 21 sets up a virtual space and arranges the player character PC, a plurality of virtual objects 31 (operation target object) that are the targets of the first action, and building objects 50 (non-operation target building objects) that are not the targets of the first action, and the like in the virtual space. The processor 21 also arranges, in addition to these, non-operable target objects (e.g., rocks, mountains fixed in the virtual space, enemy characters, and the like) that are not targets of the first action in the virtual space.

Next, the processor 21 retrieves operation data from the controller (step S101). Operation data includes data corresponding to operations on the left and right controller buttons, analog sticks, and the like. The main body apparatus 2 receives the operation data from each controller at predetermined time intervals (for example, at intervals of 1/200 second), and stores the operation data in a memory. In step S101, the processor 21 retrieves the operation data transmitted from each controller and stored in the memory. After this, the processor 21 repeats the processing from steps S101 to S109 at predetermined frame time intervals (e.g., at intervals of 1/60 second).

The processor 21 then performs the player character movement process (step S102). The processor 21 determines whether or not a move operation by the player character PC is performed based on the operation data, and if it determines that a move operation is performed, the processor 21 moves the player character PC by a movement amount equivalent to a single frame.

Next, the processor 21 performs a construction mode shift determination process (step S103). The processor 21 determines whether to shift the game to the construction mode, and if the processor 21 determines that the game is to be shifted to the construction mode, the processor 21 performs processing for shifting the game from the normal game mode to the construction mode. For example, when the player character PC is positioned in the vicinity of a predetermined non-player character NPC in the virtual space and a predetermined operation input is made, the processor 21 determines the mode is to be shifted to the construction mode and causes a shifting from the normal game mode to the construction mode. This switches the screen from a normal game mode screen (e.g., FIG. 6) to a construction mode screen (e.g., FIG. 7). If it is not determined to shift to the construction mode, the processor 21 does not perform any process to cause a shifting to the construction mode.

Next, the processor 21 performs an action determination/start process (step S104). The processor 21 determines whether or not an operation input corresponding to each action of the player character PC is made, and if an operation input is made, the processor 21 causes the player character PC to start an action corresponding to the operation input. Specifically, the processor 21 determines whether or not a first operation input for the first action has been made based on the operation data, and if the processor 21 determines that the first operation input has been made, the processor 21 causes player character PC to start the first action. After a predetermined amount of time has elapsed from the start of the first action, the player character PC enters the state of performing the first action.

In step S104, the processor 21 determines whether or not a second operation input for the second action has been made based on the operation data, and if it determines that the second operation input has been made, the processor 21 causes the player character PC to start the second action. Specifically, when the player character PC is able to execute the second action (passing through movement), the processor 21 determines whether the player has given an instruction to execute the second action. If there is a ceiling object above the player character PC and if there is a “destination where the player character PC can be arranged” further above the ceiling object, the second action is executable. When the player character PC is able to execute the second action and an instruction to execute the second action is given, the processor 21 causes the player character PC to start the second action. After a predetermined amount of time has elapsed since the second action was initiated, the player character PC is in the state of performing the second action.

Next, the processor 21 performs a drawing process (step S105). The drawing process in step S105 is performed at predetermined frame time intervals to display images in response to the player character PC movement process in step S102, the process in step S103, and the action determination/start process of step S104. For example, if the player character PC is moved in step S102, the player character PC is shown moving in the virtual space. If it is determined that the game is to be shifted to the construction mode in step S103, the shifting from the normal game mode to the construction mode is displayed over multiple frames. After a predetermined amount of time has elapsed from the start of the shifting to the construction mode, the game shifts to the construction mode. If the first action is initiated in step S104, the player character PC is shown initiating the first action over plurality of frames. If the second action is initiated in step S104, the player character PC is shown initiating the second action over plurality of frames.

The processor 21 then determines whether or not the mode has shifted to the construction mode (step S106). If it is determined that the mode has shifted to the construction mode (step S106: YES), the processor 21 executes the construction mode processing (step S120). The construction mode process is a process that is executed during the construction mode. The details of the construction mode process in step S120 are described below.

(Construction Mode Process)

Figure 23:
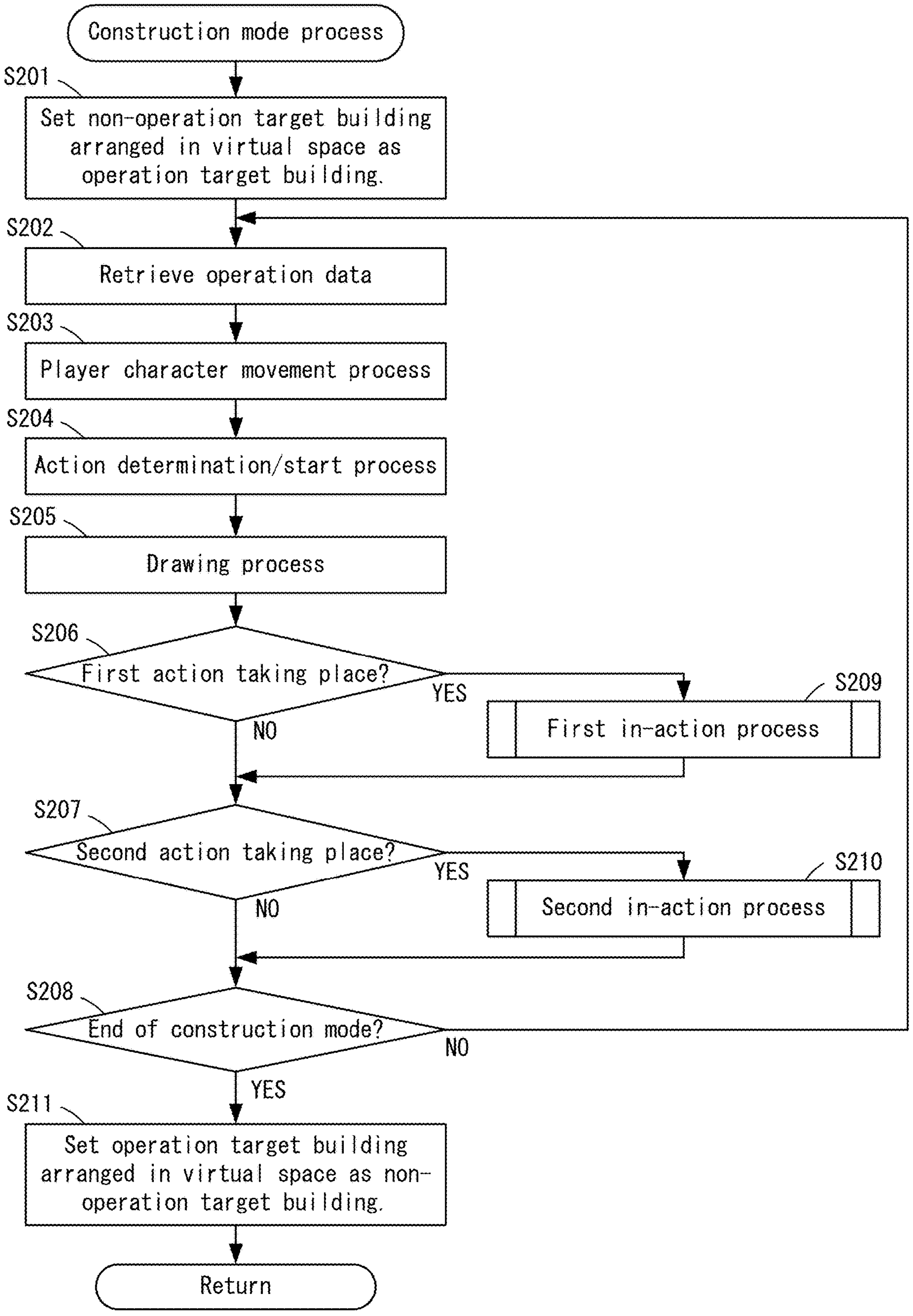
FIG. 23 is an example non-limiting flowchart showing an exemplary construction mode process in step S120.

FIG. 23 is a flowchart showing an exemplary construction mode process in step S120.

As shown in FIG. 23, the processor 21 sets the non-operation target building object placed in the virtual space to the operation target building object (step S201). Specifically, the processor 21 replaces each building unit 51 placed in the virtual space with the corresponding building unit 41. For example, in the normal game mode, if the building units 51*a*-51*c* are arranged in the virtual space in the positional relationship shown in FIG. 6, then building units 51*a*-51*c* are replaced by building units 41*a*-41*c*, respectively. As a result, the game image as shown in FIG. 7 is displayed. In the construction mode, connection objects 60 are displayed between connected building units.

Next, the processor 21 retrieves the operation data (step S202). Thereafter, the processor 21 repeats steps S202 through S208 at predetermined frame time intervals (e.g., at intervals of 1/60 second) until the construction mode is terminated.

The processor 21 then performs the player character movement process (step S203). The process in step S203 is the same as in the step S102.

Next, the processor 21 performs the action determination/start process (step S204). The same process as in step S104 above is performed. Specifically, the processor 21 determines whether or not an operation input corresponding to each action of the player character PC is made, and if an operation input is made, the processor 21 causes the player character PC to start an action corresponding to the operation input. More specifically, the processor 21 determines whether or not the first operation input of the first action has been made based on the operation data, and if the processor 21 determines that the first operation input has been made, the processor 21 causes player character PC to start the first action. After a predetermined amount of time has elapsed from the start of the first action, the player character PC enters the state of performing the first action.

In step S204, the processor 21 determines whether or not the second operation input of the second action has been made based on the operation data, and if the processor 21 determines that the second operation input has been made, the processor 21 causes the player character PC to start the second action. Specifically, when the player character PC is able to execute the second action (passing through movement), the processor 21 determines whether the player has given an instruction to execute the second action. If there is a ceiling object above the player character PC and if there is a "destination where the player character PC can be arranged" further above the ceiling object, the second action is executable. When the player character PC is able to execute the second action and an instruction to execute the second action is given, the processor 21 causes the player character PC to start the second action. After a predetermined amount of time has elapsed since the second action was initiated, the player character PC is in the state of performing the second action.

Next, the processor 21 performs a drawing process (step S205). The drawing process in step S205 is performed at predetermined frame time intervals to display images in response to the player character PC movement process in step S203 and the action determination/start process in step S204. For example, if the player character PC is moved in step S203, the player character PC moving in the virtual space is displayed. If the first action is started in step S204, the player character PC starting the first action is displayed. If the second action is initiated in step S204, the player character PC starting the second action is displayed.

Next, the processor 21 determines whether the player character PC is performing the first action (step S206). If it is determined that the player character PC is in the state of performing the first action (step S206: YES), the processor 21 executes a first in-action process (step S209). The following details the first in-action process in step S209.

(First In-Action Process)

Figure 24:
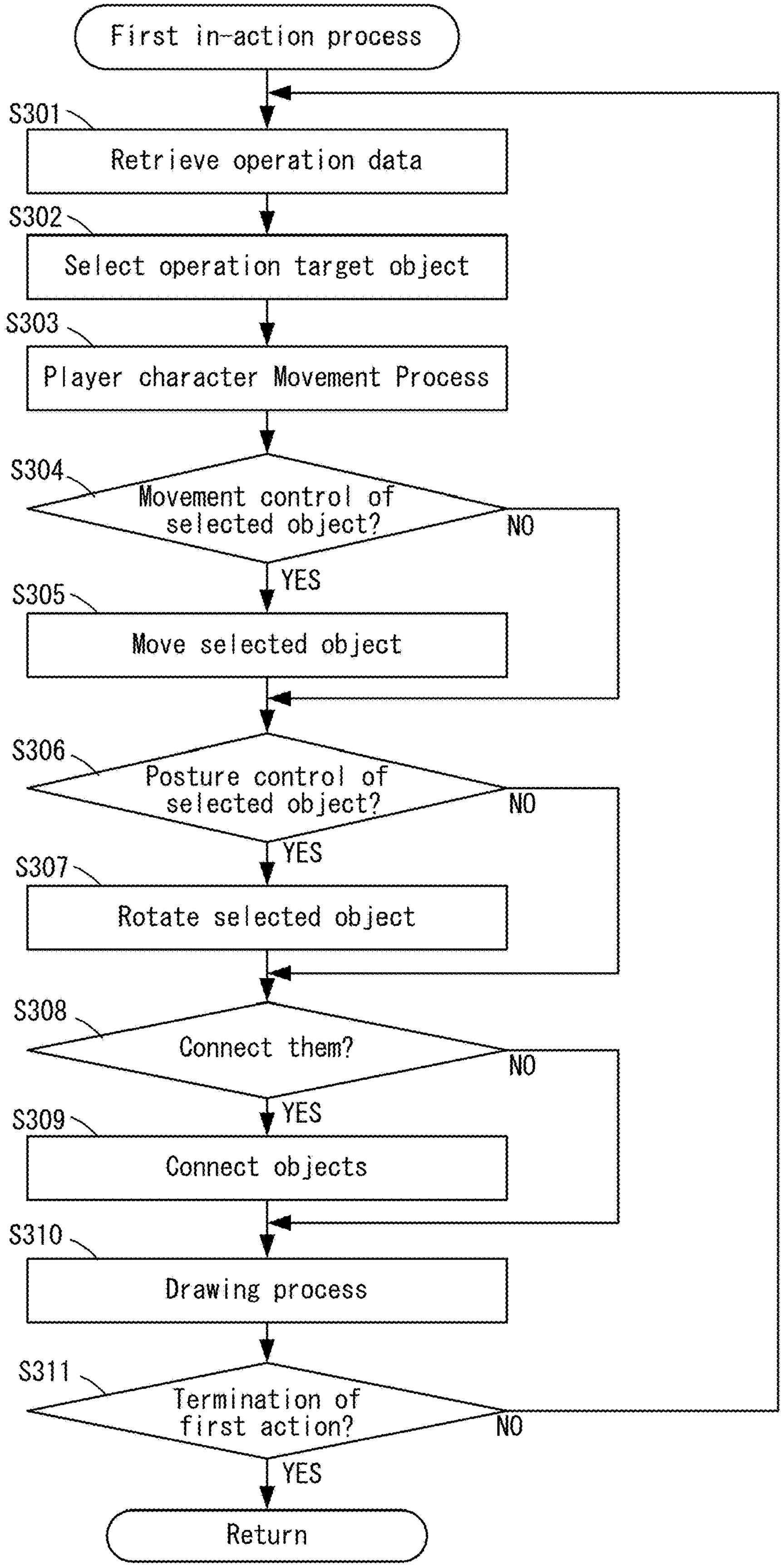
FIG. 24 is an example non-limiting flowchart showing an exemplary first in-action process in step S209.

FIG. 24 is a flowchart showing an exemplary first in-action process of step S209.

As shown in FIG. 24, the processor 21 first retrieves the operation data (step S301). After that, the processor 21 repeats the processing from step S301 to step S311 at predetermined frame time intervals (e.g., at intervals of 1/60 second) until the first action is terminated.

Next, the processor 21 selects at least one or more operation target objects arranged in the virtual space based on the operation data (step S302). Hereafter, the object selected in step S302 is referred to as the "selected object". The processor 21 sets the display mode of the selected object to a special display mode and arranges an effect image directed from the player character PC to the selected object. For example, in the construction mode, the processor 21 selects any of a plurality of the building units 41 arranged in the virtual space based on the operation data. Further, in the construction mode, the processor 21 selects any of a plurality of the virtual objects 31 arranged in the virtual space based on the operation data. Further, in the normal game mode, the processor 21 selects any of a plurality of the virtual objects 31 placed in the virtual space based on the operation data. Note that, in the normal game mode, the processor 21 does not select the building units 51 arranged in the virtual space as the selected object.

The processor 21 then performs the player character movement process (step S303). The process in step S303 is the same as one in step S102.

Next, the processor 21 determines whether to control the movement of the selected object (step S304). For example, if the player character PC moves in step S303, the processor 21 determines to control the movement of the selected object. Even if the player character PC is not moving, the movement of the selected object may be controlled if a predetermined operation input is made.

If the movement of the selected object is determined to be controlled (step S304: YES), the processor 21 moves the selected object in the virtual space (step S305). If the selected object is connected to another object, the processor 21 moves the selected object and another object connected thereto. For example, if a building unit 41 is selected in the construction mode, the processor 21 moves the selected building unit 41 (and another building unit 41 connected thereto) in the virtual space according to the movement of the player character PC. Further, when a virtual object 31 is selected in the construction mode or normal game mode, the processor 21 moves the selected virtual object 31 (and another virtual object 31 connected thereto) in the virtual space according to the movement of the player character PC.

If the process of step S305 is executed, or if step S304 results in NO, the processor 21 determines whether to perform posture control of the selected object (step S306). Specifically, if a predetermined operation input for posture control is made, the processor 21 determines to control the posture of the selected object.

If the posture of the selected object is determined to be controlled (step S306: YES), the processor 21 rotates the selected object in the virtual space (step S307). If another object is connected to the selected object, the processor 21 rotates the selected object and the other object connected thereto according to the operation input. For example, if a building unit 41 is selected in the construction mode, the processor 21 rotates the selected building unit 41 (and another building unit 41 connected thereto) in the virtual space. Further, when a virtual object 31 is selected in the construction mode or normal game mode, the processor 21 rotates the selected virtual object 31 (and another virtual object 31 connected thereto) in the virtual space according to the operation input.

If the process of step S307 is executed, or if step S306 results in NO, the processor 21 determines whether to connect the selected object with the other object (step S308). Specifically, if there is another object that meets a predetermined connection condition for connecting to the selected object, the processor 21 generates a connection object 60 connecting the selected object and the other object. If the connection instruction is given by the player while the connection object 60 is being generated, the processor 21 determines that the selected object and the other object are to be connected. For example, if a building unit 41*a* is set as the selected object in the construction mode, the processor 21 determines if there is another building unit 41 that meets the predetermined connection condition. If it is determined that there is another building unit 41 that meets the predetermined connection condition, the processor 21 generates a connection object 60 that connects the building unit 41*a* to the other building unit 41. If the connection instruction is given by the player during this state, the processor 21 determines YES in step S308. Note that, the predetermined connection conditions are not met, regardless of the positional relationship between the building unit 41 and the virtual object 31. Therefore, the building unit 41 is not connected to the virtual object 31 by the connection object 60.

If it is determined that the selected object is to be connected to another object (step S308: YES), the processor 21 connects the selected object to the other object that meets the predetermined connection condition (step S309). This connects, for example, the building units 41 to each other in the construction mode. Further, in the construction mode, for example, the virtual objects 31 are connected to each other. Further, in the normal game mode, for example, the virtual objects 31 are connected to each other.

If the process of step S309 is executed, or if step S308 results in NO, the processor 21 performs the drawing process (step S310). Specifically, the processor 21 generates a game image based on the virtual camera based on the results of the processing from step S301 to step S309. The drawing process of step S310 is performed at predetermined frame time intervals to display the movement control or the posture control of the operation target object based on the first action.

Next, the processor 21 determines whether to terminate the first action (step S311). For example, if player instructs termination of the first action, step 311 results in YES. Further, for example, if the selected object is connected to another object in step S309, step 311 results in YES. If step S311 results in NO, the processor 21 repeats the processing from step S301. If S311 results in YES, the processor 21 terminates the first in-action process shown in FIG. 24.

Returning to FIG. 23, if S206 results in NO, or if the process of step S209 is terminated, the processor 21 determines whether the player character PC is in the state of performing the second action (step S207). If it is determined that the player character PC is in the state of performing the second action (step S207: YES), the processor 21 executes a second in-action process (step S210). The following details the second in-action process of step S210.

(Second in-Action Process)

Figure 25:
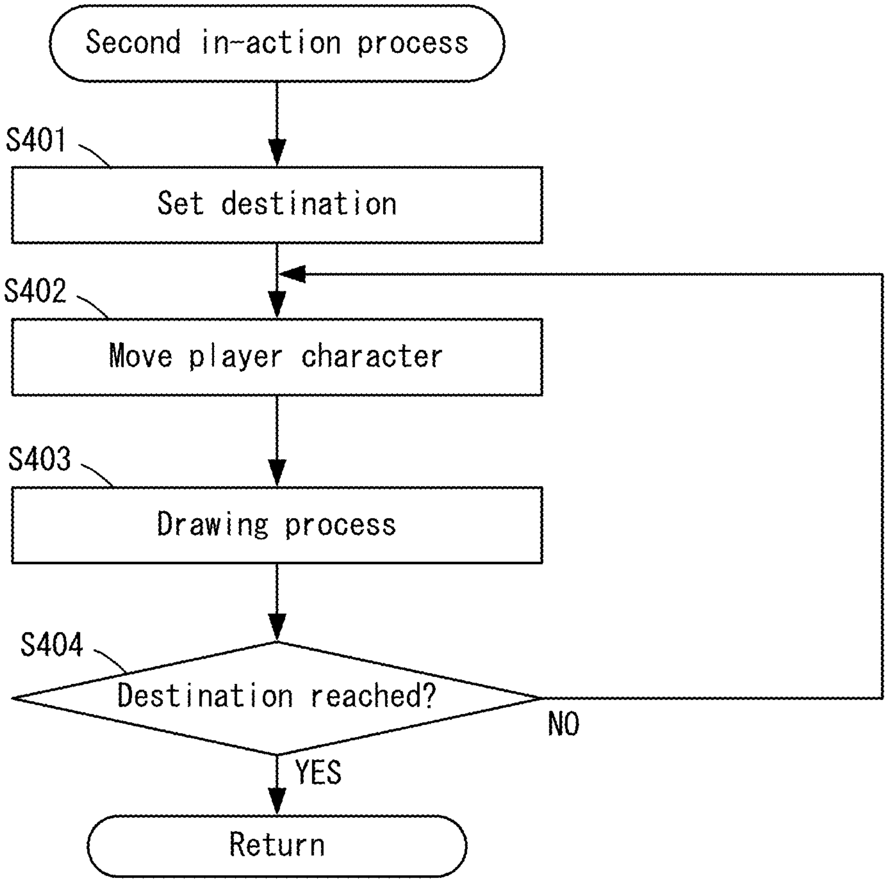
FIG. 25 is an example non-limiting flowchart showing an exemplary second in-action process of step S210.

FIG. 25 is a flowchart showing an exemplary second in-action process of step S210.

As shown in FIG. 25, the processor 21 sets the "destination where the player character PC can be arranged" (step S401).

Next, the processor 21 moves the player character PC upward (step S402). Here, the processor 21 moves the player character PC upward by a movement amount equivalent to a single frame. Thereafter, the processor 21 repeats step S402 to step S404 at predetermined frame time intervals (e.g., at intervals of 1/60 second) until the player character PC reaches the destination.

Next, the processor 21 performs the drawing process (step S403). This displays the player character PC performing the passing through movement. While the player character PC is performing the passing through movement, a background image different from usual may be displayed.

The processor 21 then determines whether the player character PC has reached the destination (step S404). If step S404 results in NO, the processor 21 repeats the processing from step S402. If S404 results in YES, the processor 21 terminates the second in-action process shown in FIG. 25.

Returning to FIG. 23, if step S207 results in NO, or if the process in step S210 is terminated, the processor 21 determines whether to terminate the construction mode (step S208). For example, if the player instructs termination of the construction mode, the processor 21 determines to terminate the construction mode. For example, if the termination of the construction mode is instructed while the player character PC is located in the vicinity of a predetermined non-player character NPC, the processor 21 determines to terminate the construction mode. Even if the player instructs termination of the construction mode, the processor 21 does not determine to terminate the construction mode if a predetermined construction terminating condition is not met. For example, if a virtual object 31 other than the building object 40 is arranged in a predetermined area of the virtual space where the building objects 40 (building units 41) are arranged, the processor 21 does not determine to terminate the construction mode. In this case, the player may be given a predetermined warning.

If it is determined that the construction mode is not terminated (step S208:NO), the processor 21 repeats the processing from step S202.

On the other hand, if it is determined that the construction mode is terminated (step S208: YES), the processor 21 sets the operation target building object arranged in the virtual space as the non-operation target building object (step S211). Specifically, the processor 21 replaces each building unit 41 arranged in the virtual space with the corresponding building unit 51. For example, in the construction mode, if the building units 41*a* to 41*d* are arranged in the virtual space with the positional relationship as shown in the upper part of FIG. 11, the building units 41*a* to 41*d* are replaced by building units 51*a* to 51*d*, respectively. Further, at the time of setting an operation target building object to a non-operation target building object, the processor 21 also enables/disables interior objects (e.g., furniture objects, water objects) arranged inside the non-operation target building object based on the posture of the non-operation target building object. Specifically, the processor 21 disables the interior object if the inclination of the non-operation target building object exceeds the threshold value, and enables the interior object if the inclination of the non-operation target building object is not more than the threshold value. This way, a game image as shown in the lower part of FIG. 11 is displayed and the game shifts from the construction mode to the normal game mode. The connection object 60 placed between the connected building units in the construction mode are not displayed in the normal game mode.

When the process of step S211 is executed, the processor 21 terminates the construction mode process shown in FIG. 23.

Returning to FIG. 22, if S106 results in NO, or if the process of step S120 is terminated, the processor 21 determines whether the player character PC is in the state of performing the first action (step S107). The process in step S107 is the same process as step S206 described above. If it is determined that the player character PC is in the state of performing the first action (step S107: YES), the processor 21 executes the first in-action process (step S130). The process in step S130 is the same process as step S209 described above. In the first in-action process of step S130, the first action is not performed on the building object and the first action is performed on the virtual objects 31, because the game is in the normal game mode.

If S107 results in NO, or if the process of step S130 is terminated, the processor 21 determines whether the player character PC is in the state of performing the second action (step S108). The process in step S108 is the same process as step S207 described above. If it is determined that the player character PC is in the state of performing the second action (step S108: YES), the processor 21 executes the second in-action process (step S140). The process in step S140 is the same process as step S210 described above. In the second in-action process of step S140, the player character PC is able to enter the interior of the room of the building object based on the second action, because the game is in the normal game mode. On the other hand, in the second in-action process of step S210, the player character PC is not able to enter the interior of the room of the building object based on the second action, because the game is in the construction mode.

If S108 results in NO, or if the process of step S140 is terminated, the processor 21 determines whether to terminate the game (step S109). When the player instructs termination of the game, the processor 21 determines that the game is terminated and terminates the game processing shown in FIG. 22. On the other hand, if step 109 results in NO, the processor 21 repeats the processing from step S101.

As described above, in this exemplary embodiment, at least one operation target object (e.g., virtual object 31, building unit 41), out of a plurality of objects in the virtual space, which is set as a target of the first action by the player character based on an operation input is subjected to movement control based on the first action. In a first situation (e.g., construction mode), at least one operation target building object (e.g., building unit 41) that is a building object set as an operation target object is subjected to movement control based on the first action. At a time of shifting from the first situation to a second situation (normal game mode), the operation target building object arranged is set to a non-operation target building object that is a building object corresponding to the operation target building object and that is not a target of the first action. Further, at a time of shifting from the second situation to the first situation, the non-operation target building object arranged is set to the operation target building object corresponding to the non-operation target building object.

This allows the player to control the movement of the building object by the first action that can operate the object. Thus, in a game with the first action, building objects can be generated and changed in a simple manner with less processes dedicated for construction. Further, since the player has already performed the first action operation during the game, the player can generate and change the building object in a way that is easy for the player to understand. Further, in the second situation, the building object having been generated or changed can be fixed, which keeps the completed building from being inadvertently moved by the first action.

Further, as the first action, the plurality of operation target building objects can be connected to each other, and the movements of the operation target building objects connected can be controlled as a whole. This allows the plurality of operation target building objects to be moved while maintaining their positional relationship, and allows easier creation of buildings constituted by a plurality of operation target building objects. Further, the operation target building object has a plurality of connection points with a connection direction set thereto, and when a plurality of operation target building objects are connected, the position and the posture of each operation target building object is adjusted so that the connection points are connected to each other based on their connection directions. This allows the plurality of operation target building objects to be easily connected without performing detailed adjustment of their positions and their postures.

Further, the operation target building object has a shape that is subjectable to collision determination and has a shape that prohibits an access by the player character PC. This way, for example, an unnecessary object is restricted from being arranged inside the operation target building object during construction of a building.

Further, an interior object (e.g., furniture objects) is arranged in the interior space of the non-operation target building object. If the posture of the building object meets a predetermined condition at the time of setting an operation target building object to a non-operation target building object, the interior object is disabled. This way, for example, if the non-operation target building object is inclined, the internal object can be disabled, and the internal object is kept from being displayed in an unnaturally inclined state.

(Modification)

An exemplary embodiment is thus described hereinabove. It should be noted that the above-described exemplary embodiment is no more than an example, and various modifications as described below are possible.

For example, the processing of the above-described flowchart is no more than an example, and the sequence, the contents, and the like of the processing may be suitably modified.

In the exemplary embodiment above, the building object is configured so that the movement and the posture of the building object is controllable based on the first action during the construction mode, and that the movement and the posture of the building object is not controllable based on the first action during the normal game mode. In another exemplary embodiment, it may be only the movement of the building object that is controllable based on the first action during the construction mode.

The exemplary embodiment described above deals with a case where, during the normal game mode, the movement of the building object is not controlled by the first action or another action of the player character PC, or by another object. In another exemplary embodiment, although the movement of the building object is not controlled based on the first action during the normal game mode, the movement of the building object may be controlled by another action of the player character PC or by another object.

The exemplary embodiment described above deals with a case where, during the construction mode, the movement of the building objects can be controlled based on the first action, and the movement of virtual objects 31 can be controlled based on the first action. In another exemplary embodiments, the movement control of the virtual object 31 based on the first action may be disabled during the construction mode.

The exemplary embodiment described above deals with a case where, if the posture of the building unit 41 is changed during the construction mode, the interior object in the corresponding building unit 51 are disabled at a time of shifting to the normal game mode. In another exemplary embodiments, the interior object in the building unit 41 may be disabled if the posture of building unit 41 is changed even during the construction mode. In the exemplary embodiment above, the interior object within a single building unit is displayed or hidden by enabling or disabling the interior object. In another exemplary embodiment, a building unit including an interior object and a building unit not including an interior object may be prepared in advance, and if the posture of the building unit meets a predetermined condition, the building unit not including an internal object may be arranged in the virtual space. The interior object arranged inside the building unit may be disabled in this way.

In the above exemplary embodiment, a connection point is set for each building unit 41, and connection directions (normal and tangential direction) were set for the connection point. When the building units 41 are connected to each other, the position of each building unit 41 is adjusted so that their connection points match with each other, and the posture of each building unit 41 is adjusted based on their connection directions. In another exemplary embodiments, a normal direction or the tangential direction may be set for the connection point, and the posture of the building unit 41 may be adjusted based on the normal direction or the tangential direction. Further, in another exemplary embodiments, only the position of the building unit 41 may be adjusted by the connection point. Further, only the posture of the building unit 41 may be adjusted by the connection point. Further, the building unit 41 may be connected in any position and posture without setting a connection point to the building unit 41. A connection point may also be set on the virtual object 31, and the position and/or the posture of the virtual object 31 may be adjusted by the connection point to connect the virtual object 31.

The operation target object (building objects and virtual objects) is merely an example, and other objects may be used as the target of the first action.

The configuration of the hardware for performing the above-described game processing is merely an example, and the above game processing may be performed by any other piece of hardware. For example, the above game processing may be executed in any information processing system such as a personal computer, a tablet terminal, a smartphone, or a server on the Internet. The above game processing may be executed in a dispersed manner by a plurality of apparatuses.

The configurations of the above exemplary embodiment and its modifications can be optionally combined together unless they contradict each other. Further, the above description is merely an example of the exemplary embodiment, and may be improved and modified in various manners other than the above.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims. While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein a game program that, when executed, causes an information processing apparatus to perform operations comprising:

moving a player character in a virtual space based on player input, the virtual space having a plurality of virtual objects located therein, each virtual object in the plurality of virtual objects being either a building type object or a non-building type object; and based on player input, moving, in the virtual space, at least one virtual object of the plurality of virtual objects that has been set as a target of a first action by the player character, provided that the at least one virtual object that is set as the target of the first action is movable and provided that the player has activated an acquired ability;

wherein when shifting from a first mode to a second mode, each building type object in the plurality of virtual objects is set to a corresponding immovable building type object that is immovable;

wherein when shifting from the second mode to the first mode, each immovable building type object in the plurality of virtual objects is set to a corresponding movable building type object that is movable; and wherein each non-building type object in the plurality of virtual objects is movable in the first mode and in the second mode.

2. The non-transitory computer-readable storage medium of claim 1, wherein the operations further comprise connecting a plurality of building type objects of the plurality of virtual objects to each other, integrating the connected building type objects, and moving the integrated and connected building type objects as the first action.

3. The non-transitory computer-readable storage medium of claim 2, wherein:

the building type objects each have a connection point with a connection direction set thereto; and positions and postures of the building type objects are adjustable so that, when the plurality of building type objects are connected together, their connection points are connected based on their connection directions.

4. The non-transitory computer-readable storage medium of claim 2, wherein at least one of the building type objects in the plurality of virtual objects is a room object for constituting a building.

5. The non-transitory computer-readable storage medium of claim 4, wherein:

the room object, when immovable, has a shape that is subjectable to collision determination and the player character is allowed to enter inside, and the room object, when movable, has a shape that is subjectable to collision determination and the player character is not allowed to enter inside.

6. The non-transitory computer-readable storage medium of claim 5, wherein the room object, when movable, has a blocking object that blocks an opening of the room, at a location corresponding to the opening.

7. The non-transitory computer-readable storage medium of claim 5, wherein the operations further comprise moving the player character to a destination as a second action of the player character based on player input, if there is an object that serves as a ceiling above the player character, wherein the player character cannot be arranged inside of the room object when the room object is movable.

8. The non-transitory computer-readable storage medium of claim 1, wherein:

at least one immovable building type object has an interior object arranged in its interior space; and a predetermined type of the interior object is disabled if the posture of the at least one immovable building type object meets a predetermined condition.

9. The non-transitory computer-readable storage medium of claim 8, wherein the disabling is performed by erasing the predetermined type of the interior object.

10. The non-transitory computer-readable storage medium of claim 2, wherein the operations further comprise connecting together a plurality of virtual objects except for a combination of a building type object and a non-building type object, integrating the connected objects, and moving the integrated and connected objects as the first action.

11. The non-transitory computer-readable storage medium of claim 2, wherein:

a connection object is arranged at connecting positions of a plurality of the building type objects if the building type objects are brought into a state of being connectable to each other, and the connection object is not arranged at the connecting positions if a plurality of the building type objects are immovable.

12. An information processing system, comprising:

a memory and one or more processors configured to cooperate to at least:

move a player character in a virtual space based on player input, the virtual space having a plurality of virtual objects located therein, each virtual object in the plurality of virtual objects being either a building type object or a non-building type object; and based on player input, moving, in the virtual space, at least one virtual object of the plurality of virtual objects that has been set as a target of a first action by the player character, provided that the at least one virtual object that is set as the target of the first action is movable and provided that the player has activated an acquired ability;

wherein when shifting from a first mode to a second mode, each building type object in the plurality of virtual objects is set to a corresponding immovable building type object that is immovable;

wherein when shifting from the second mode to the first mode, each immovable building type object in the plurality of virtual objects is set to a corresponding movable building type object that is movable; and wherein each non-building type object in the plurality of virtual objects is movable in the first mode and in the second mode.

13. The information processing system of claim 12, wherein a plurality of building type objects are connected to each other, the connected building type objects are integrated, the integrated and connected building type objects are moved as the first action.

14. The information processing system of claim 13, wherein:

the building type objects each have a connection point with a connection direction set thereto; and positions and postures of the building type objects are adjustable so that, when the plurality of building type objects are connected together, their connection points are connected based on their connection directions.

15. The information processing system of claim 13, wherein at least one of the building type objects in the plurality of virtual objects is a room object for constituting a building.

16. The information processing system of claim 15, wherein:

the room object, when immovable, has a shape that is subjectable to collision determination and the player character is allowed to enter inside, and the room object, when movable, has a shape that is subjectable to collision determination and the player character is not allowed to enter inside.

17. The information processing system of claim 16, wherein the room object, when movable, has a blocking object that blocks an opening of the room, at a location corresponding to the opening.

18. The information processing system of claim 16, wherein:

the player character is moved to a destination as a second action of the player character based on player input, if there is an object that serves as a ceiling above the player character, and the player character cannot be arranged inside of the room object when the room object is movable.

19. The information processing system of claim 12, wherein:

at least one immovable building type object has an interior object arranged in its interior space; and a predetermined type of the interior object id disabled if the posture of the at least one immovable building type object meets a predetermined condition.

20. The information processing system of claim 19, wherein the disabling is performed by erasing the predetermined type of the interior object.

21. The information processing system of claim 13, wherein a plurality of virtual objects are connected together except for a combination of a building type object and a non-building type object, the connected objects are integrated, and the connected and integrated objects are moved as the first action based on the operation input.

22. The information processing system of claim 13, wherein:

a connection object is arranged at connecting positions of a plurality of the building type objects if the plurality of the building type objects are brought into a state of being connectable to each other, and the connection object is not arranged at the connecting positions if a plurality of the building type objects are immovable.

23. An information processing apparatus, comprising:

one or more processors and a non-transitory computer readable storage medium storing instructions executable to perform operations comprising:

moving a player character in a virtual space based on player input, the virtual space having a plurality of virtual objects located therein, each virtual object in the plurality of virtual objects being either a building type object or a non-building type object; and based on player input, moving, in the virtual space, at least one virtual object of the plurality of virtual objects that has been set as a target of a first action by the player character, provided that the at least one virtual object that is set as the target of the first action is movable and provided that the player has activated an acquired ability;

wherein when shifting from a first mode to a second mode, each building type object in the plurality of virtual objects is set to a corresponding immovable building type object that is immovable;

wherein when shifting from the second mode to the first mode, each immovable building type object in the plurality of virtual objects is set to a corresponding movable building type object that is movable; and wherein each non-building type object in the plurality of virtual objects is movable in the first mode and in the second mode.

24. An information processing method executable by one or more processors, the method comprising:

moving a player character in a virtual space based on player input, the virtual space having a plurality of virtual objects located therein, each virtual object in the plurality of virtual objects being either a building type object or a non-building type object; and based on player input, moving, in the virtual space, at least one virtual object of the plurality of virtual objects that has been set as a target of a first action by the player character, provided that the at least one virtual object that is set as the target of the first action is movable and provided that the player has activated an acquired ability;

wherein when shifting from a first mode to a second mode, each building type object in the plurality of virtual objects is set to a corresponding immovable building type object that is immovable;

wherein when shifting from the second mode to the first mode, each immovable building type object in the plurality of virtual objects is set to a corresponding movable building type object that is movable; and wherein each non-building type object in the plurality of virtual objects is movable in the first mode and in the second mode.

25. The information processing method of claim 24, further comprising connecting a plurality of building type objects of the plurality of virtual objects to each other, integrating the connected building type objects, and moving the integrated and connected building type objects as the first action.

26. The information processing method of claim 25, wherein:

the building type objects each have a connection point with a connection direction set thereto; and positions and postures of the building type objects are adjustable so that, when the plurality of building type objects are connected together, their connection points are connected based on their connection directions.

27. The information processing method of claim 25, wherein at least one of the building type objects in the plurality of virtual objects is a room object for constituting a building.

28. The information processing method of claim 27, wherein:

the room object, when immovable, has a shape that is subjectable to collision determination and the player character is allowed to enter inside, the room object, when movable, has a shape that is subjectable to collision determination and the player character is not allowed to enter inside.

29. The information processing method of claim 28, wherein the object, when movable, room has a blocking object that blocks an opening of the room, at a location corresponding to the opening.

30. The information processing method of claim 28, further comprising moving the player character to a destination as a second action of the player character based on player input, if there is an object that serves as a ceiling above the player character, wherein the player character cannot be arranged inside of the room object when the room object is movable.

31. The information processing method of claim 24, wherein:

at least one immovable building type object has an interior object arranged in its interior space; and a predetermined type of the internal object is disabled if the posture of the at least one immovable building type object in which the internal object is placed meets predetermined conditions.

32. The information processing method of claim 31, wherein the disabling is performed, by erasing the predetermined type of the interior object.

33. The information processing method of claim 25, further comprising connecting together a plurality of virtual objects except for a combination of a building type object and a non-building type object, integrating the connected objects, and moving the integrated and connected objects as the first action.

34. The information processing method of claim 25, wherein:

a connection object is arranged at connecting positions of a plurality of the building type objects if the building type objects are brought into a state of being connectable to each other, and the connection object is not arranged at the connecting positions if a plurality of the building type objects are immovable.

* * * * *